(12) United States Patent
Sutton et al.

(10) Patent No.: US 7,266,532 B2
(45) Date of Patent: Sep. 4, 2007

(54) RECONFIGURABLE AUTONOMOUS DEVICE NETWORKS

(75) Inventors: Jeffrey P. Sutton, Bellaire, TX (US); Ian MacQueen Drummond Jamieson, Rumford, RI (US)

(73) Assignee: The General Hospital Corporation, Boston, MA (US)

( * ) Notice: Subject to any disclaimer, the term of this patent is extended or adjusted under 35 U.S.C. 154(b) by 587 days.

(21) Appl. No.: 10/161,058

(22) Filed: Jun. 3, 2002

(65) Prior Publication Data

US 2003/0005030 A1  Jan. 2, 2003

Related U.S. Application Data

(60) Provisional application No. 60/295,287, filed on Jun. 1, 2001.

(51) Int. Cl.
G06F 15/18 (2006.01)
(52) U.S. Cl. .............................. 706/12; 706/14; 706/46
(58) Field of Classification Search .................. 706/12, 706/14, 46
See application file for complete search history.

(56) References Cited

U.S. PATENT DOCUMENTS

| | | | |
|---|---|---|---|
| 5,736,982 A * | 4/1998 | Suzuki et al. ............... | 715/706 |
| 6,422,061 B1 * | 7/2002 | Sunshine et al. ........... | 73/29.01 |
| 2003/0222819 A1 * | 12/2003 | Karr et al. .................. | 342/457 |

OTHER PUBLICATIONS

Ren C. Luo et al, Multiagent Based Multisensor Resource Management System, Oct. 1998, IEEE, Conference on Intelligent Robots and Systems, 1034-1039.*
http://www.fas.org/man/dod-101/sys/ship/ddg-993.htm, DDG-993 KIDD-class, FAS printed Nov. 21, 2006 but of historic significance dating to 1978, 1-9.*
Jeffrey P. Sutton, Report Documentation Page, OMB No. 0704-0188, Reconfigurable Network of Networks for Multi-Scale Computing, Aug, 27, 2002, Office of Naval Research, 6.*

(Continued)

Primary Examiner—Joseph P Hirl
(74) Attorney, Agent, or Firm—Wolf, Greenfield & Sacks, P.C.

(57) ABSTRACT

The present invention describes the use of autonomous devices, which can be arranged in networks, such as neural networks, to better identify, track, and acquire sources of signals present in an environment. The environment may be a physical environment, such as a battlefield, or a more abstract environment, such as a communication network. The devices may be mobile, in the form of vehicles with sensors, or may be information agents, and may also interact with one another, thus allowing for a great deal of flexibility in carrying out a task. In some cases, the devices may be in the form of autonomous vehicles which can collaboratively sense, identify, or classify a number of sources or targets concurrently. The autonomous devices may function as mobile agents or attractors in a network, such as a neural network. The devices may also be aggregated to form a network of networks and provide scalability to a system in which the autonomous devices are operating.

32 Claims, 16 Drawing Sheets

OTHER PUBLICATIONS

J.P. Sutton and I. Jamieson, "Reconfigurable Network of Neural Networks for Autonomous Sensing and Analysis", Proceedings of the Fifth International Conference on Cognitive an Neural Systems, (2001), 64.

J.A. Anderson, M.T. Gately, P.A. Penz and D.R. Collins, "Radar Signal Categorization Using a Neural Network", IEEE Proceedings, 78 (1990), pages 1646-1657.

J.P. Sutton, J.S. Beis and E.H. Trainor, "A Hierarchical Model of Neocortical Synaptic Organization", Mathematical Computatinal Modelling vol. 11, 346-350, (1988).

J. Kennedy and R.C. Eberhart, "Swarm Intelligence", Morgan Kaufmann. (ISBN 1-55860-595-9) pages 114 and 287 to 325 inclusive.

J.M. Epstein and R. Axtell, "Growing Artificial Societies: Social Science from the Bottom Up", MIT Press, (1996).

C.W. Reynolds, "Flocks, Herds and Schools: A Distributed Behavioral Model", Computer Graphics, 21, 25-34 (1987).

J. Toner and Y. Tu, "Flocks, Herds and Schools: A Quantitative Theory of Flocking", Physical Review E., 58, 4828-4859, (1999).

B. Latane, "The Psychology of Social Impact", American Psychologist, 36, pp. 343-356, (1981).

E. Hutchins, "Cognition in the Wild", Bradford Books (ISBN 0-262-58149-9) pages 175 to 262 inclusive.

J. Sutton and I. Jamieson, Reconfigurable Networking for Coordinated Multi-Agent Sensing and Communications.

J. Sutton and I. Jamieson, "Coherent Behavior Among Weakly Interacting Search Vehicles", (2002).

\* cited by examiner

RECONFIGURABLE AUTONOMOUS DEVICE NETWORKS

REFERENCE TO RELATED APPLICATION

This application claims the benefit, under 35 U.S.C. §119(e), of U.S. Provisional Application Ser. No. 60/295,287, filed Jun. 1, 2001, entitled NEURALLY INSPIRED DISTRIBUTED COMPUTING FOR RECONFIGURABLE NETWORKS, which application is hereby incorporated herein by reference.

GOVERNMENT SUPPORT

This work was funded in party by grant number ONR N00014-99-1-0884, from the Office of Naval Research (ONR). Accordingly, the United States Government may have certain rights to this invention.

TECHNICAL FIELD

This application relates to the field of communication, neural networks, target identification, and autonomous sensors. Some embodiments are directed to environmental surveillance.

BACKGROUND

Neural networks have been loosely analogized to biological systems such as those present in the brain or nervous system in which many neurons are interconnected by a complex network capable of carrying information. Neural networks may be simulated by digital systems such as computers, and are based on parallel architectures which are generally characterized by: simple processing elements, highly interconnected configuration of the elements, the elements exchanging many simple messages and preferably adaptive interconnection between the elements. Once a neural network is established, for example using hundreds or thousands of simple elements and interconnections, it can greatly benefit from a stored library of knowledge using learning rules. A neural network adapts by changing the weights accorded to interconnections by an amount proportional to the difference between a desired output and an actual output of some portion of the network. Such systems can be useful in situations where drawing on a knowledge base as well as learning in real-time can be used to make future decisions. A more complete description of neural networks and learning algorithms can be found elsewhere, and is an evolving art. However, those skilled in the art are aware of various techniques for constructing and simulating neural networks and the many machine learning and artificial intelligence algorithms which apply thereto.

Furthermore, the problem of searching large spaces for specific information is a growing problem in many fields, including communications, genomics, proteomics and military operations. The recent success by industry in sequencing genomes using large-scale parallel computing among relatively simple machines is testament to the power of coordinated search efforts. Small mobile communication systems for surveillance and other tasks face similar challenges in (a) identifying features of complex data sets (e.g. targets) and (b) coordinating the activities of multiple search vehicles using limited bandwidth.

SUMMARY

The present invention involves the use of autonomous devices, which can be arranged in networks, such as neural networks, to better identify, track, and acquire sources of signals present in an environment. The environment may be a physical environment, such as a battlefield, or a more abstract environment, such as a communication network. The devices may be mobile, in the form of vehicles with sensors, or may be information agents, and may also interact with one another, thus allowing for a great deal of flexibility in carrying out a task. In some cases, the devices may be in the form of autonomous vehicles which can collaboratively sense, identify, or classify a number of sources or targets concurrently. The autonomous devices may function as mobile agents or attractors in a network, such as a neural network. The devices may also be aggregated to form a network of networks and provide scalability to a system in which the autonomous devices are operating.

One embodiment is directed to an autonomous device for collaboratively identifying objects in an environment, the autonomous device comprising a sensor unit adapted for sensing signals due to the objects; a storage unit containing object template information corresponding to the objects; a computation unit adapted for processing the sensed signals, wherein the computation unit can compute a match between the sensed signals and the object template information; a communication unit adapted for communicating information relating to operation of the autonomous device with other devices; and a control unit adapted for making a decision effecting a status of the autonomous device based at least on a result of the match, wherein the autonomous device operatively collaborates with other devices, similarly constructed, for identifying the objects in the environment.

Another embodiment is directed to a method for identifying objects in an environment, comprising providing at least one autonomous device for operation in the environment; providing object template data, corresponding to the objects, in a database coupled to the autonomous device; sensing a signal from an object using a sensor coupled to the autonomous device; evaluating a match between an object template and the sensed signal; and taking an action based at least on a result of the evaluation.

One other embodiment is directed to system for identifying at least one object in an environment, comprising a first autonomous device which detects at least a first signal from the object; a second autonomous device which detects at least a second signal from the object; and a communication network which connects the first and second autonomous devices and passes information between said first and second autonomous devices; wherein each of said first and second autonomous devices each comprises a control module, a sensor module, and a communications module; wherein the first autonomous device can evaluate a first match between the first signal and a first reference object template; wherein the second autonomous device can evaluate a second match between the second signal and a second reference object template; and wherein said first and second matches being indicative of an identity of the at least one object in the environment.

In yet another embodiment, a network is presented, comprising a plurality of nodes; a plurality of branches connecting said nodes; and at least one autonomous agent capable of moving information from a first node to a second node; wherein said at least one autonomous agent comprises a network condition sensor and can carry information pertaining to a network condition.

Another embodiment is directed to a method for determining an optimum configuration of agents operating in an environment, the method comprising sensing, on a first agent in the environment, a first environmental signal; forming a first representation of the first environmental signal; sensing, on a second agent in the environment, a second environmental signal; forming a second representation of the second environmental signal; exchanging, between the first and second agents, the respective first and second representations; computing a performance metric corresponding to a first configuration of the first and second agents; and reconfiguring the first and second agents, based on the performance metric, to arrive at a new configuration of the first and second agents.

BRIEF DESCRIPTION OF THE DRAWINGS

The invention can be more fully understood from consideration of the following detailed description of illustrative embodiments thereof, and from consideration of the accompanying drawings in which.

DETAILED DESCRIPTION

Figure 1:
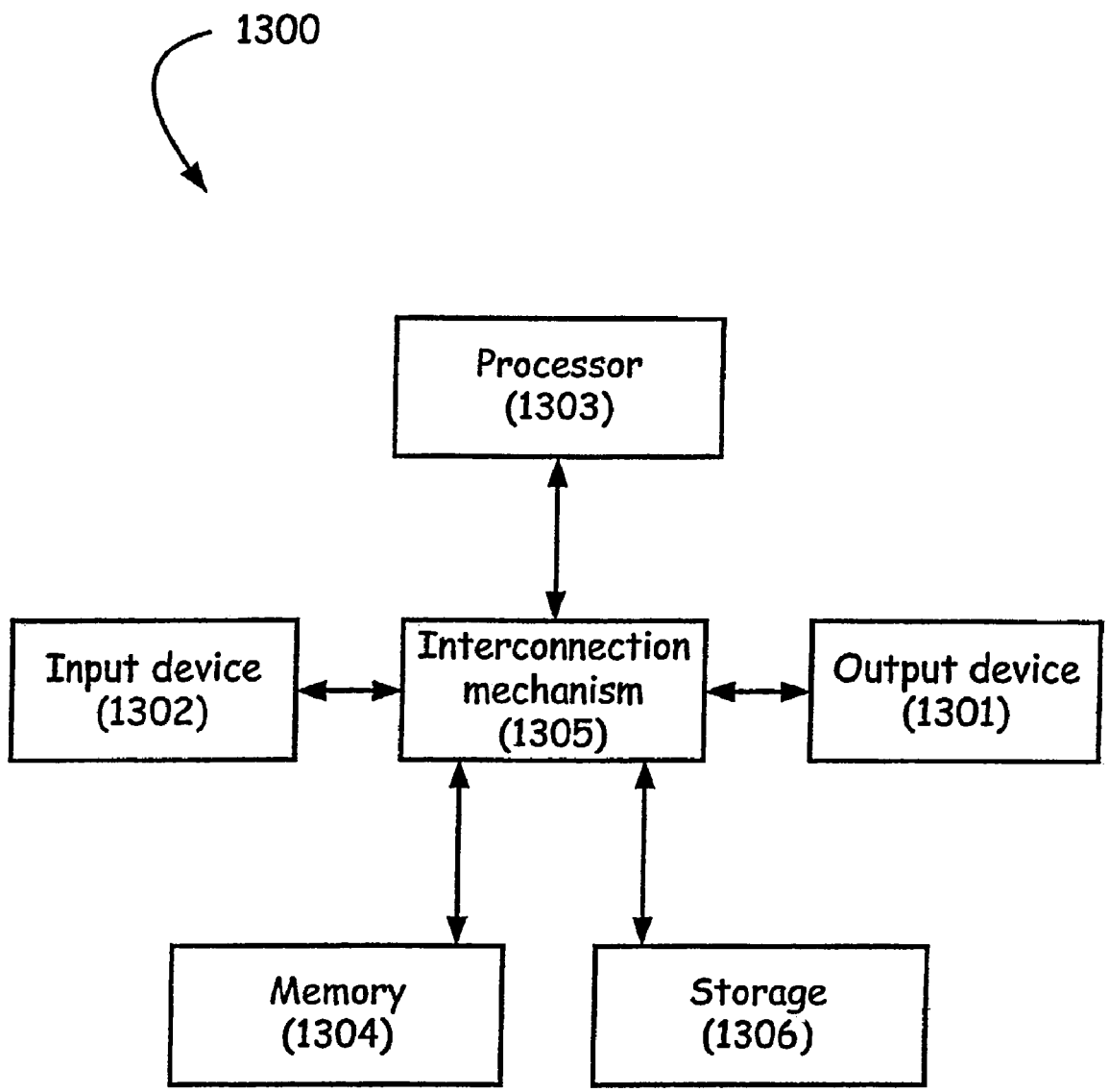
FIG. 1 shows an exemplary data processing computer system and its primary components.

As mentioned briefly above, the present invention involves the use of autonomous devices, which can be arranged in networks, such as neural networks, to better identify, track, and acquire sources of signals present in an environment. The environment may be a physical environment of any size and dimension, such as a battlefield, building, or the human body, or a more abstract environment, such as a computer or a communication network. The devices may be mobile, in the form of autonomous vehicles (AVs) with sensors, or may be information agents, and may also interact with one another, thus allowing for a great deal of flexibility in carrying out a task. In some cases, the autonomous devices may collaboratively sense, identify, or classify a number of sources or targets concurrently. The autonomous devices may function as mobile agents or attractors in a network, such as a neural network. The devices may also be aggregated to form a network of networks and provide scalability to a system in which the autonomous devices are operating.

Exemplary applications include military, medical, communication, economic and sociological applications. Traditional physical environments at various scales are contemplated, including macroscopic environments and nanostructures. Additionally, informational and "soft" environments are contemplated, such as those existing in communication networks, whether wireless or not, and those cognitive biological environments as well as non- or semi-cognitive environments such as exist in computers and other machines. One embodiment of the present model uses a dynamic reconfigurable network, where each node in the network is itself an attractor neural network, is mobile and communicates with other nodes using limited vector information. This model is referred to sometimes as the AVSYS (Autonomous Vehicle System) model for historic reasons, but is applied herein generally, and is not limited to applications using autonomous vehicles.

Communication between the autonomous devices is carried out in a flexible way, which can depend on their mode of operation. Two or more autonomous devices may communicate directly, or they may exchange information through a centralized or external command center according to the specific use required in an application. This aspect of the invention is enhanced by proper selection and formatting of the information that is communicated between the autonomous devices to allow for successful completion of tasks in low bandwidth environments. Selection of the proper communication packets (e.g. their size, content and threshold for transmission) can offer advantages to the overall operation of the system in some embodiments, which will be described below.

Furthermore, some aspects of the present invention allow for greater reliability and efficiency because its is highly reconfigurable. The autonomous devices may operate independently as discussed above, or they may operate in groups and subgroups, each cooperatively tracking or locating an environmental source, or target, with one or more autonomous devices taking the "lead" in acquiring a set of sources. The lead autonomous devices may recruit and rely on other autonomous devices, referred to as "wings," to assist in carrying out the task. The roles of lead and wing devices can be held by the same autonomous device at different times. As sources or targets are acquired and identified, the system of autonomous devices can be reconfigured to use any free or available autonomous devices in the task of locating and acquiring remaining sources which have not yet been acquired or classified.

Various embodiments and aspects of the present invention are directed to identification of sources of environmental signals, using techniques such as correlation, overlap, or matching of received environmental signals with known reference signals or templates. The system is noise-tolerant and decisions may be made, as will be described below, to determine when a given target has been identified with some acceptable degree of certainty.

Various auxiliary functions can be built into systems such as those described herein. For example, actions may be taken subsequent to identification or acquisition of a target, such as communicating or reporting the presence and location of the target, helping in vectoring or deciding the direction or motion for one or more autonomous devices and tagging or destroying an acquired target.

Additionally, techniques for data representation and decision-making are presented herein. In the context of "tracking parties" comprising groups of autonomous devices working together, the present invention permits quantitative evaluation of the sufficiency of the tracking party size and the configuration of the autonomous devices in the tracking party. The present system may be configured and reconfigured dynamically to optimize the distribution and behavior of the autonomous devices involved, and adapting if necessary.

In order to acquire the targets, which may be stationary or mobile, the autonomous devices are generally equipped with sensors adapted for sensing environmental signals from the targets. These signals may be originally emitted by active targets, such as a radio frequency (RF) or infra-red (IR) transmissions, or may be signals modulated by the targets, such as by scattering radar or sonar signals from passive targets. Such signals, whether generated by an active source or modulated by a passive source, are then propagated into the environment in which the autonomous devices operate. The environmental signals can thus have properties or features which characterize the targets, for example by information such as state vectors that encode information relevant to the target, including azimuth, elevation, frequency, pulse width and pseudo-spectra of the target.

The AVSYS model is capable of detecting and characterizing particular known targets, and is able to adapt to the emergence of new previously unknown or intermittent targets. By intensively processing individual target information at the local level and selectively communicating this processed information globally, the model is capable of optimally reconfiguring its agents while limiting its communications bandwidth. Moreover, since each individual agent or device is trained on the environment, a new or intermittent target can be quickly learned and disseminated throughout the system.

Aspects of various embodiments of the present invention may be implemented in software, hardware, firmware, or combinations thereof. Various elements of an embodiment, either individually or in combination, may be implemented in part as a computer product including a computer-readable medium on which instructions are stored for access and execution by a processor. When executed by the computer, the instructions instruct the computer to perform the various steps of the process.

The nature of the present invention will become apparent upon reading the description of the aspects of embodiments thereof, and especially when read in conjunction with the associated figures in which like elements are denoted by like reference numerals.

The embodiments described below may be implemented in software running on a computer. Simulations demonstrating the performance of the system and the efficiency of the algorithms have been carried out and are described in the following passages. Simulations can be used in conjunction with systems according to the present invention for developing algorithms, training human operators and machines, testing performance and other functions. Hence, simulators are also considered to fall within the purview of the present invention.

The simulation software allows a user using a graphical user interface (GUI) to select the number of sources, the number of autonomous devices and other parameters of the simulation. For example, the user assigns each source a value (0 or 1) denoting whether it is active or inactive, ON or OFF. This is accomplished using suitable input elements, e.g., text or input boxes, pull-down menus, radio buttons, etc. Also, the user can assign a value using the inputs when a source is to become active, called a "pop-up" source, and when the source is to drop out, if applicable. The user can also selectively assign a target priority rating to each of the targets. Other parameters which can be controlled by the user include a classification threshold, $\theta$.

The simulator also provides graphical and other output to the user. Simulation results may also be output to files, stored for future processing and analysis by humans or machines.

The main screen shows the topography of the operating domain as a map or other graphical grid. Maps of the operating domain can be imported into the application from map databases. Also shown symbolically are the sources and autonomous devices operating in the domain. These are color-coded in one embodiment to depict sources which were classified and distinguish them from those which have not been classified yet. The lead and wing autonomous devices are also shown, with graphical features and numbers beside each to indicate which source they are tracking. The simulator also displays a progress bar indicating how many passes have been performed in classifying the set of sources.

In some embodiments, aspects of the present invention are carried out on a data processing system or on a computer system. An example of such a computer system 1300 is shown in FIG. 1. Various elements of the embodiments described herein, either individually or in combination, may be implemented on the computer system 1300. Typically, the computer system 1300 includes at least one central unit coupled, directly or indirectly, to one or more output devices 1301 which transmit information. The transmitted information may be in any of a number of formats or a combination of formats, including information specifically made for display on a display device, available to one or more users or machines. The computer system 1300 is also coupled, directly or indirectly, to one or more input devices 1302 which receive input from one or more users or machines. A main unit may include one or more processors 1303 coupled, directly or indirectly, to a memory system 1304 via one or more interconnection mechanisms 1305, examples of which include one or more buses and/or switches. The input devices 1302 and the output devices 1301 are also coupled to the processor 1303 and to the memory system 1304 via the interconnection mechanism 1305. The computer system 1300 may further comprise a storage system 1306 in which information is held on or in a non-volatile medium. The medium may be fixed in the system or may be removable.

The computer system 1300 may be a general purpose computer system which is programmable using a computer programming language. Computer programming languages suitable for implementing such a system include at least procedural programming languages, object-oriented programming languages, and macro languages, or combinations thereof. The computer system 1300 may also be specially-programmed, special-purpose hardware, or one or more application-specific integrated circuits (ASICs), or some combination thereof.

In a general-purpose computer system, the processor 1303 is typically a commercially-available processor which executes a program called an operating system which controls the execution of other computer programs and provides scheduling, input/output and other device control, accounting, compilation, storage assignment, data management, memory management, communication and data flow control and other services. The processor and operating system define the computer platform for which application programs in other computer programming languages are written. The invention is not limited to any particular processor, operating system or programming language.

Figure 2:
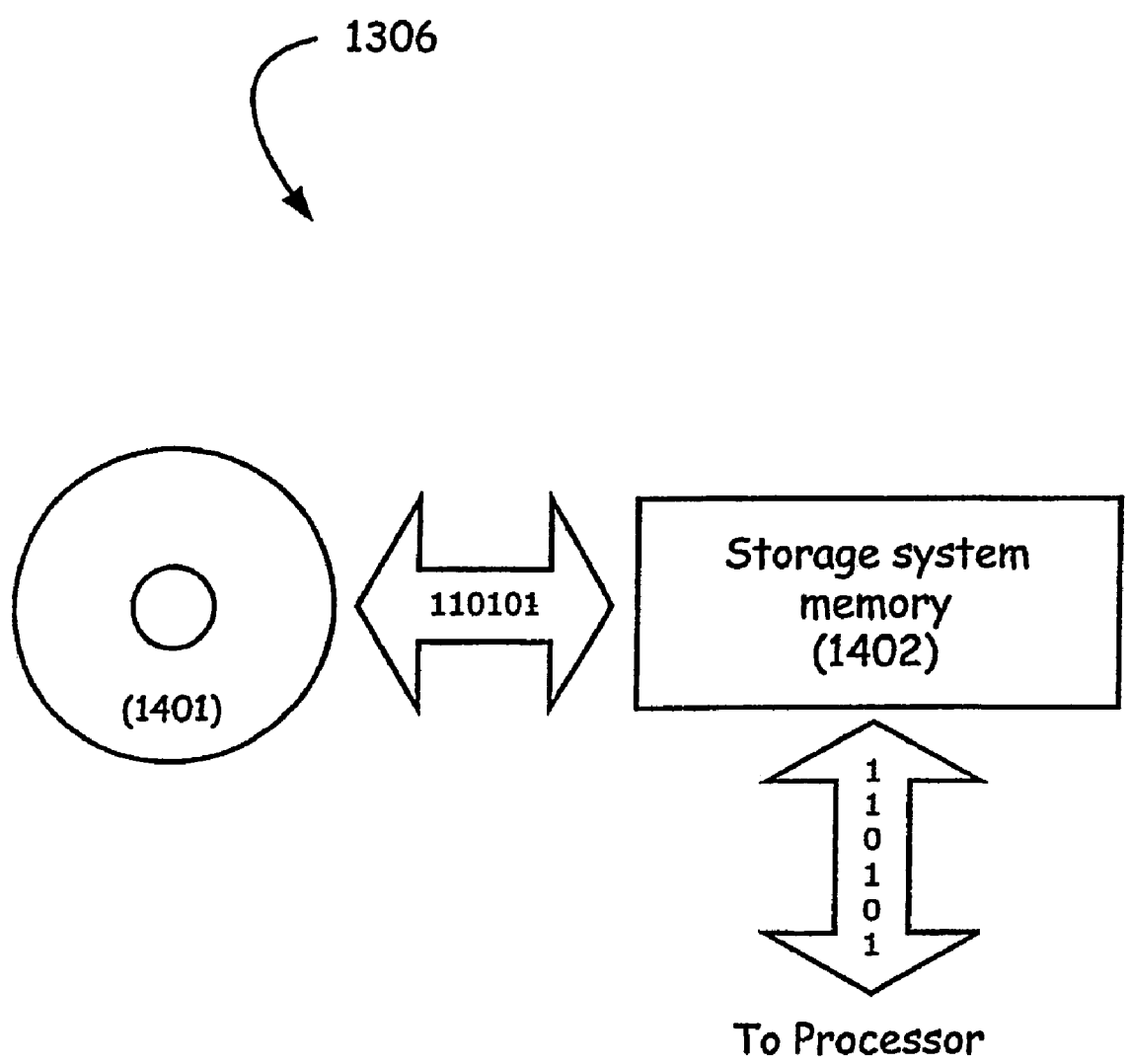
FIG. 2 shows an exemplary storage system which can be used with the data processing computer system.

The storage system 1306, shown in greater detail in FIG. 2, typically includes a computer-readable and writeable nonvolatile recording medium 1401 in which signals or instructions are stored that define a program to be executed by the processor 1303 and/or information stored on or in the medium 1401 to be used by the program. The medium 1401 may, for example, be a disk or semiconductor memory (e.g., flash or combination thereof, or some other form of data storage). Typically, in operation, the processor 1303 causes data to be read from the nonvolatile recording medium 1401 into another memory 1402 that allows for faster access to the information by the processor 1303 than does the medium 1401. This memory 1402 is typically a volatile, random access memory (RAM), such as a dynamic random access memory (DRAM) or static random access memory (SRAM). It may be located in storage system 1306, or in memory system 1304. The processor 1303 generally manipulates the data within the storage system 1306 and/or memory 1304 and then copies the data to the storage system 1306 and/or memory 1304 after processing is completed. A variety of mechanisms are known for managing data movement between the medium 1401 and the memory element 1304,1402, and the invention is not limited thereto. The invention is also not limited to a particular memory system 1304 or storage system 1306.

Figure 3:
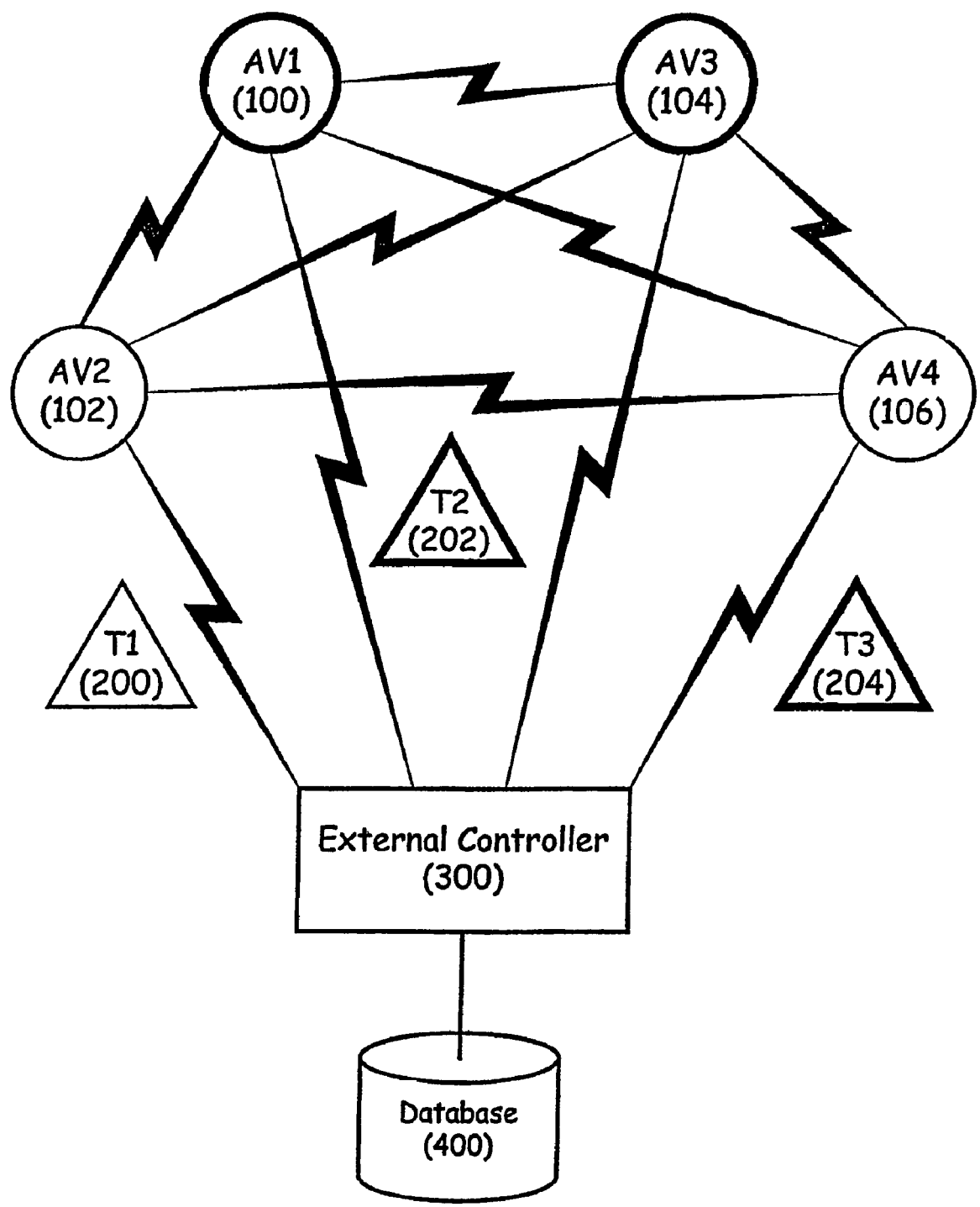
FIG. 3 shows an exemplary embodiment of a system comprising autonomous vehicles, targets, an external controller and database, including communication paths.

FIG. 3 shows a system of multiple autonomous devices 100-106, which are in communication with one another and are also in communication with an external controller 300. The autonomous devices are indicated by circles. The external controller 300 may include a central communication unit and is coupled to a database 400.

Communication may take place between various components of the system over one of any suitable communication channels. For example, autonomous devices may communicate over wireless radio frequency channels in addition to using microwave communication channels, optical communication methods and other wireless and wire-connected communication networks, including any which are currently used for telephony or networking and other similar channels which may be developed or may become known to those skilled in the art of communication. The communication may further take advantage of auxiliary functions utilized in communication, such as data compression and encryption. Various data compression and encoding and decoding methods may also be utilized, for example, in cases where it becomes beneficial for the purpose of overcoming excess noise in the communication channel.

Of course this configuration is not meant to be limiting, and an almost infinite variety of configurations are possible, some of which will be discussed in more detail below. The lead autonomous devices (100, 104) are indicated by bold circular outlines. FIG. 3 also shows three targets, as triangles, two of which (202, 204) have been identified or classified and are designated as such in the figure with bold triangular outlines. Another target 200 is yet unidentified or unclassified and does not have a bold outline to indicate the same.

In some embodiments, during the acquisition phase each autonomous device attempts to increase the overlap of its selected target with its stored target template by vectoring towards the emitter. Classification of a target is complete when the overlap of the target signal with the stored template exceeds some preset threshold. The task of detecting and identifying the ensemble of emitters is complete when all emitters have been classified.

Figure 4:
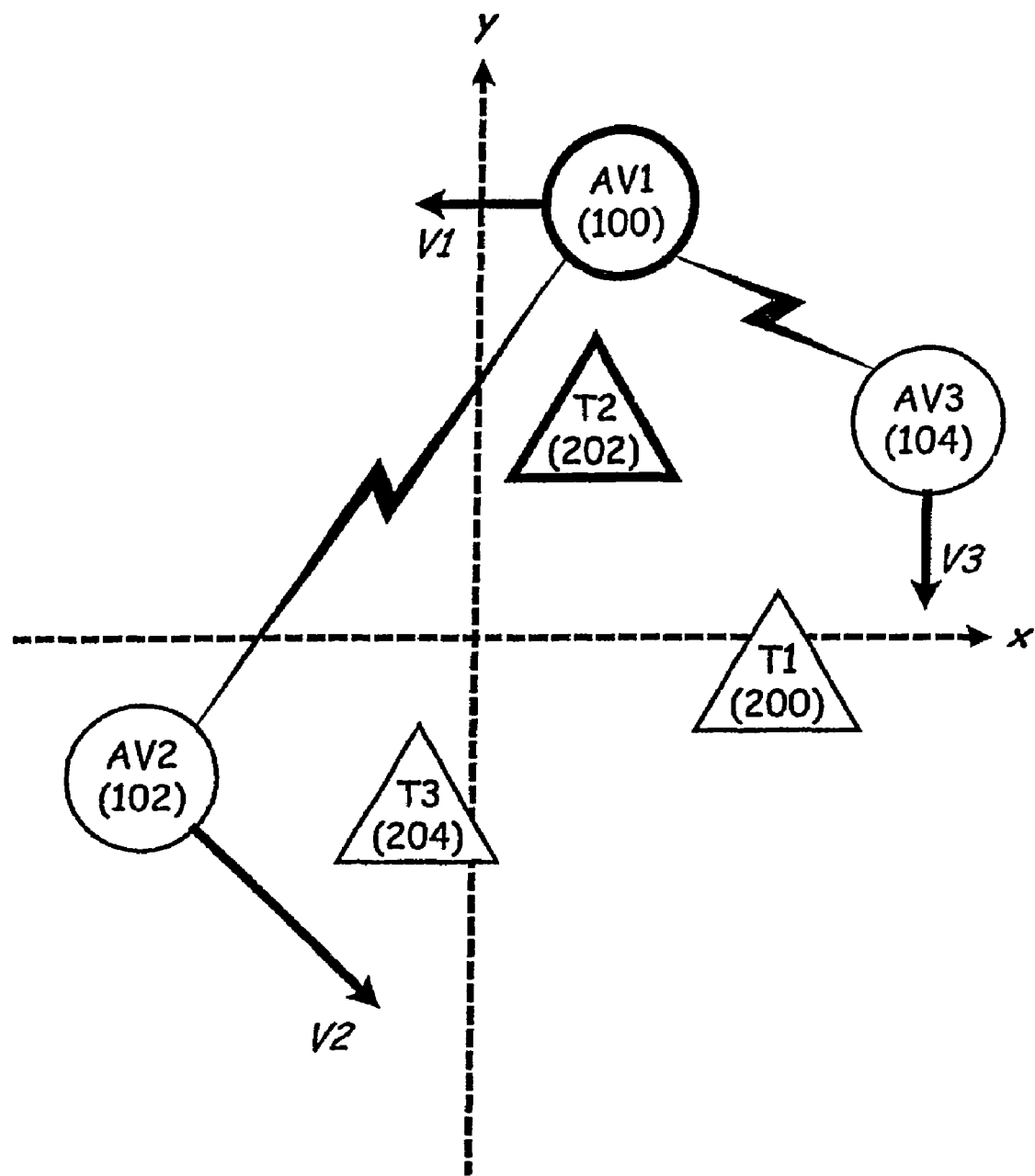
FIG. 4 shows an exemplary system of autonomous vehicles and targets located in an environment having locations denoted by coordinates x and y.

FIG. 4 depicts a group of autonomous devices (100, 102, 104) and targets (200, 202, 204) lying in some geographical arrangement shown as a two-dimensional space (x, y). This illustrates that in some scenarios, targets may be scattered about a range and the autonomous devices may be made to search over this range in order to locate and classify the targets. The figure shows a simple depiction of objects and/or devices in relative motion in an environment drawn having spatial coordinates, dividing the space into quadrants, and representative directions of motion.

In FIG. 4, lead autonomous device too has some position in the first quadrant and is traveling at some velocity V1 to the west. In communication with the lead autonomous device 100 are two wing autonomous devices 102 and 104. Autonomous device 102 is in the third quadrant, and has a velocity vector V2 and is moving to the southeast. Autonomous device 104 is located in the first quadrant and has a velocity vector V3 to the south. The system of autonomous devices has identified or classified target 202, and is operating to locate and classify targets 200 and 204. The figure shows the autonomous devices moving according to some pattern dictated by a logical algorithm used for translation. In some embodiments, the autonomous devices will move to minimize their distance from their respective targets, and will thus have velocity vectors in the direction of their respective targets.

It should be understood that the targets may also be mobile, having time-varying positions and velocities. Also, the autonomous devices may be stationary sensors that perform their function without changing their positions. Combinations of mobile and stationary targets and/or autonomous devices are also possible according to the present invention. It should be further understood that the present invention applies to objects such as targets and autonomous devices and sensors which may operate in more than two dimensions, such as systems and devices which translate in three dimensions.

Additionally, new sources may become active after a period of inactivity. Sources which are active can also become inactive at any time. The sources which appear as active when they were previously inactive are referred to as "pop-up" sources because they pop up on the sensors of the autonomous devices when they become active. The sources which cease to be active after having been active are called "drop-out" sources. Note that the terms "active" and "inactive" have been used in this particular instance to indicate sources that can be sensed by the autonomous device's sensors, and are not meant to distinguish from passive sources, which may also be pop-up or drop-out sources in this context.

The present invention also allows for prioritizing targets according to a priority scheme. This way, autonomous devices can selectively decide to pursue classification of the higher-priority sources/targets based on their priority rating. If system resources do not allow for tracking all of the active sources at once, the higher-priority sources can be tracked first. Then, the autonomous devices move on to the successively lower priority sources, and so on.

Figure 5:
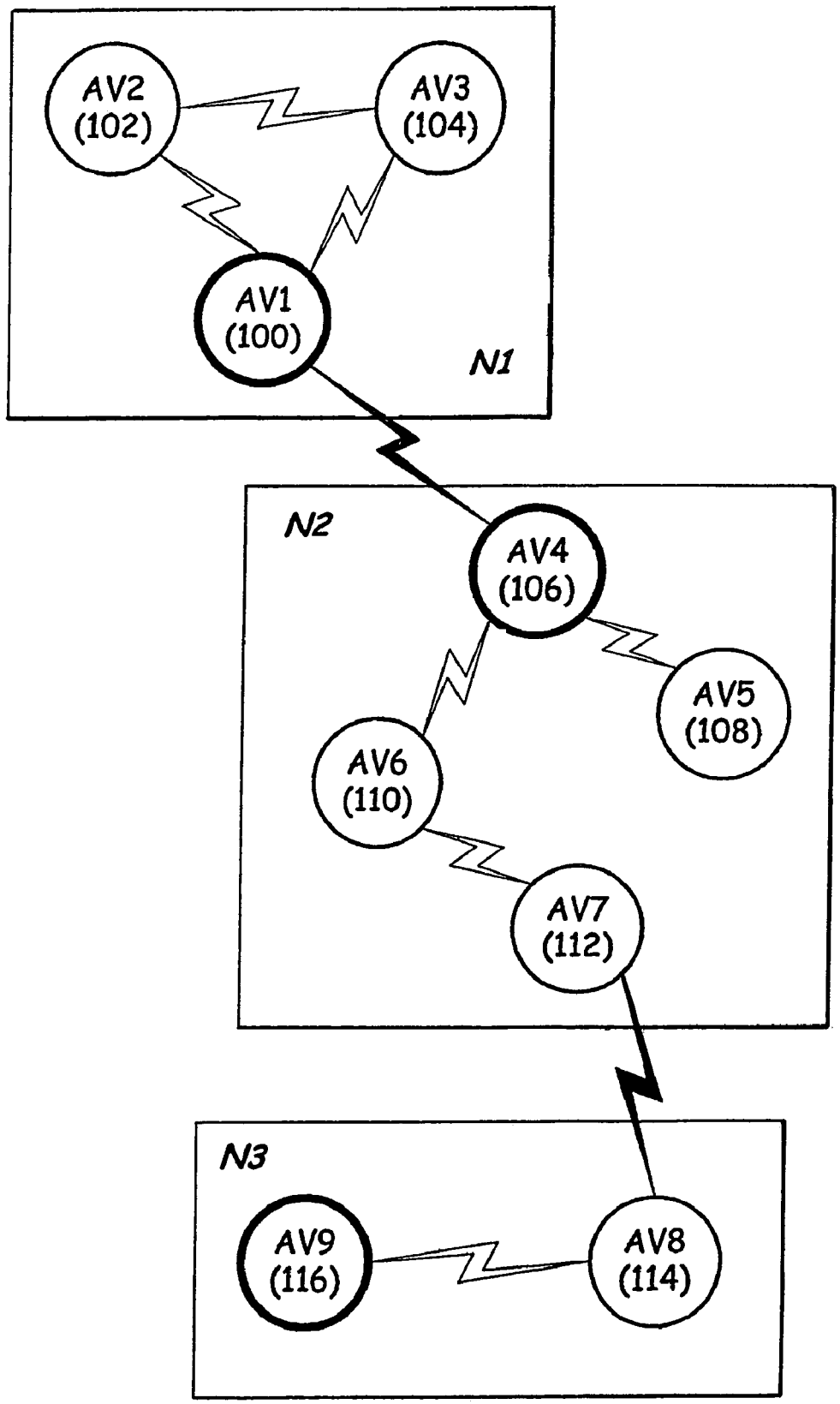
FIG. 5 shows an exemplary network of networks comprising three networks (N1, N2 and N3)

FIG. 5 illustrates how autonomous devices may be arranged in more complex configurations. Here, three networks N1, N2 and N3 are in operation. Network N1 comprises lead autonomous device 100 and two wing autonomous devices 102 and 104. Lead autonomous device 100 is in communication with lead autonomous device 106 from network N2. Network N2 comprises lead autonomous device 106 and three wing autonomous devices 108, 110 and 112. Autonomous device 112 from network N2 is in communication with autonomous device 114 from network N3. Network N3 comprises the wing autonomous device 114 and a lead autonomous device 116.

The three networks N1, N2 and N3 form a network of networks (NoN). This leads to a sophisticated system of autonomous devices which is highly scalable and configurable. Communication channels may be cut and re-established between almost any autonomous device, ground controller or mobile controller. In some aspects, the configuration of autonomous devices resembles that of a biological system or neural network. Note that any of the constituent networks may itself comprise other smaller-scale networks of autonomous devices.

Note that the autonomous devices and the system of autonomous devices may be implemented entirely in software. That is, modules implemented in software on one or more than one machine executing said software can exchange information in the collaborative accomplishments of some tasks. Here each individual software module can perform certain tasks and computations and then exchange results of such computations with the other modules according to the present invention.

Figure 6:
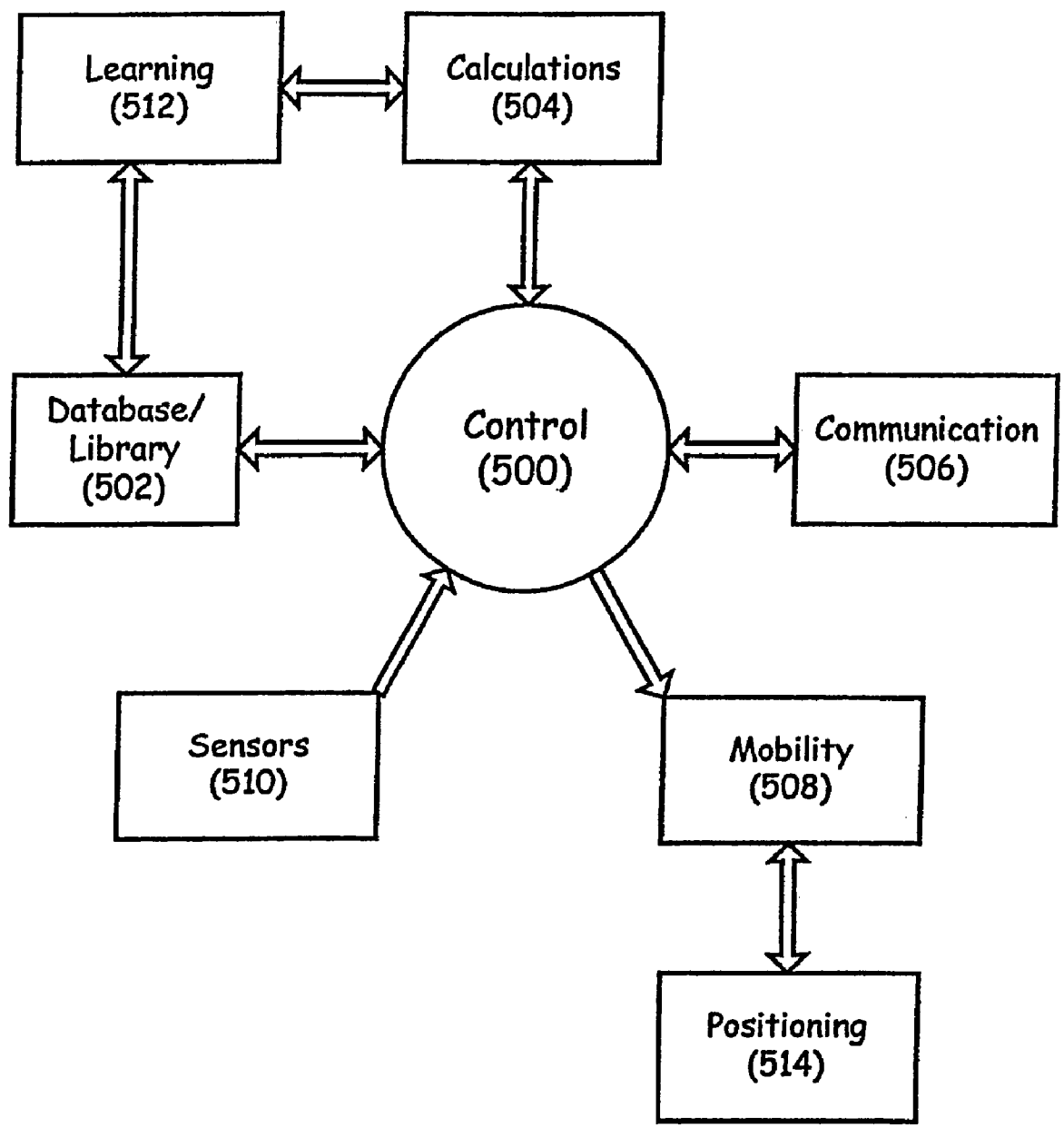
FIG. 6 shows an exemplary block diagram of an autonomous device having various component modules or units.
Figure 7A:
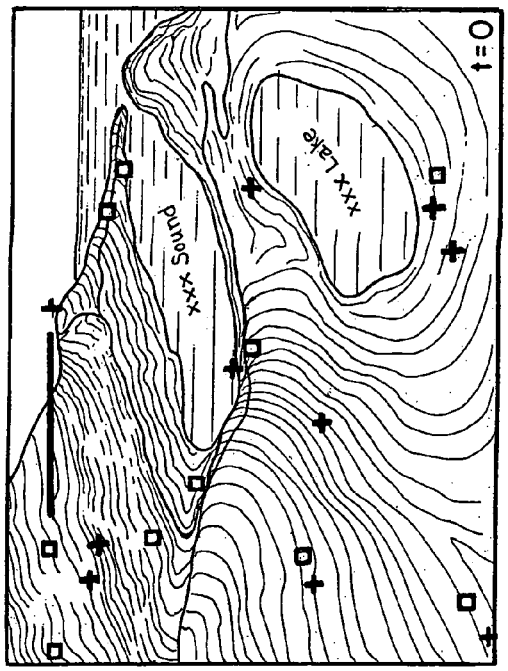
FIG. 7 shows an exemplary result of a simulation of autonomous devices cooperatively identifying a group of targets.
Figure 7B:
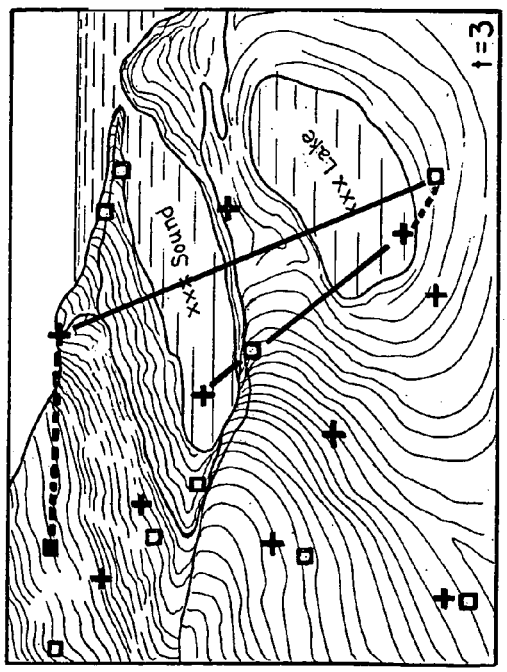
Figure 7C:
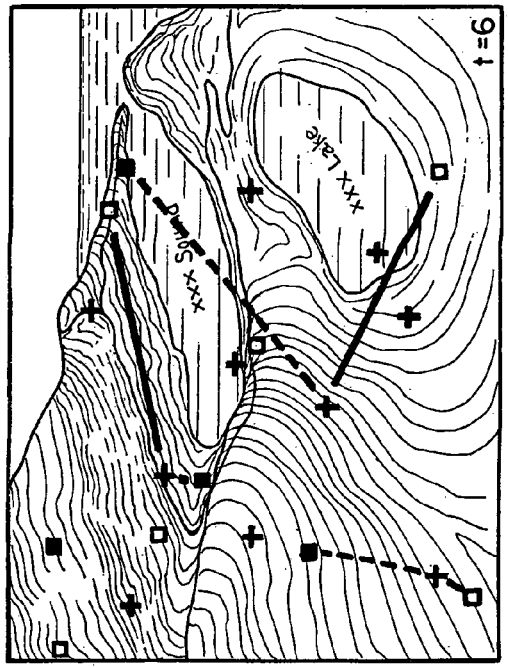
Figure 7D:
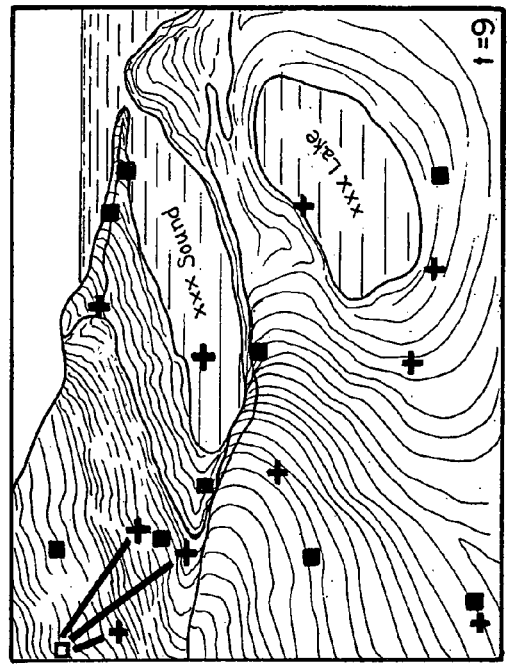

An exemplary individual autonomous device 100 in its internal structure according to an embodiment of the present invention is described below. Within each autonomous device 100 reside several units, each providing one or more functions. FIG. 6 illustrates a simplified depiction of an autonomous device having a control unit 500, which controls the operation of the autonomous device and coordinates its other functions. Other units or modules include a sensor unit 510 which has sensory receptors or instruments for receiving environmental signals, such as RF or IR signals, optical emissions, acoustic emissions or other signals. The sensor unit 510 relays the information to the control unit 500.

A database or library unit 502 may also be included on board an autonomous device. This is not the only configuration possible, as libraries, data and archive information can also be sent to and from an autonomous device through a communication channel to some system or subsystem coupled to a remote database. The database or library unit 502 contains stored information such as preprogrammed target templates for identifying known targets. The database or library unit 502 is also used to store new signals from novel targets which are detected by the autonomous device. Such signals may be uploaded or downloaded to another database or autonomous device through a communication means, and works in conjunction with an artificial learning system in some embodiments to expand the knowledge base of the autonomous device and other autonomous devices and systems connected to it as part of a larger system.

A processor unit or a calculations unit 504 is also employed on board the autonomous device 100. The processor unit 504 performs any of a number of useful functions, such as matching and overlap functions, to be discussed later, or correlation functions to determine whether a match has been achieved between a signal sensed by the sensor unit 510 and a known template stored in the database unit 502. The processing unit 504 is used to calculate quantitative overlap results of an overlap function and compare such results to pre-programmed thresholds for deciding on future actions of the autonomous device 100. Such decisions include whether to communicate certain information to other autonomous devices. Performing calculations on board the autonomous device 100 may in some embodiments reduce the amount of communication bandwidth required, as the calculations are done locally on the autonomous device 100 without needing to transfer excess data elsewhere. This also improves reliability in case communication channels are interrupted. The processing unit 504 may be an integral part of the control unit 500 and executes pre-programmed algorithms or newly-uploaded instructions on a computer processor for example.

A communication unit 506 is also available to the autonomous device 100. In some embodiments, this may comprise a wireless transmitter/receiver and an antenna. The communication unit 506 can be used to couple a lead autonomous device to other autonomous devices, including wing autonomous devices. The communication unit 506 is used in some instances to transmit commands to wing autonomous devices that will determine the actions of the wing autonomous devices.

Another function of the communication unit 506 is to transmit and receive information corresponding to target data collected by other autonomous devices. By sharing information on environmental signals collected by each autonomous device, the group of autonomous devices individually and collectively can enhance their abilities to carryout their function. For example, each autonomous device 100 may communicate to all other autonomous devices when it has sensed or identified one or more targets.

Alternatively, each autonomous device may exchange information only with the lead autonomous device in its group or with an external controller 300, the lead autonomous device or external controller 300 then decides which information to transmit to other autonomous device networks operating in the system.

In some embodiments, a threshold is used to determine whether information collected by an autonomous device 100 is relevant or required to be transmitted to other autonomous devices. For example, a match quality or overlap may be calculated indicating the similarity of a detected environmental signal or target signature to that of a signature or template stored in a database onboard an autonomous device 100. If the match quality exceeds a certain threshold, using a known metric, then the autonomous device 100 may alert the other autonomous devices operating in the region that a particular target has possibly been located or perhaps even that it has been positively identified. Even probabilistic information can be used by other autonomous devices collaboratively operating to locate and classify a given target.

A mobility unit 508 receives information from the control unit 500 indicative of a translation decision in mobile autonomous devices. The processing unit 504 and control unit 500 typically will act on information collected by the sensors unit 510 and/or the communications unit 506 to decide the optimum direction in which and speed at which the autonomous device 100 should move to acquire a given target. The mobility unit 508 may then directly or indirectly control propulsion and navigation systems onboard the autonomous device 100. An autonomous device 100 may act independently and perform its own decisions, or it may be merely guided by an external controller 300 or another lead autonomous device 100. In some embodiments, a positioning unit 512 is coupled to the autonomous device 100 or to the mobility unit 508 in a way which allows the autonomous device 100 to determine its own position in space. This position may be relative or absolute. The positioning unit 512 may be in a form of a global positioning system (GPS) receiver, or an inertial navigation system, or a radio beacon guided navigation and positioning system or any other positioning system. Maps or contour data of a given region in which the autonomous device 100 is operating may be stored on the positioning unit 512, or in the database library unit 502, or uploaded to the autonomous device 100 through the communication unit 506.

A dedicated unit, or a portion of another unit which performs the same function, can be identified as one implementing machine learning tasks. A learning unit 512 is coupled to the processing unit 504 and the database unit 502. The learning unit 512 allows the autonomous device 100 to learn new patterns and behavior using newly-acquired information. For instance, if the autonomous device 100 senses new types of target signals in the environment, it can use this information to develop its own library of signals and determine a course of action based on the new signals. This can be done, for example, by comparing only certain selected features of the new signals with analogous features of signals previously known to the autonomous device 100 and stored in its database unit 502. The learning unit 512 is adapted for performing computations in conjunction with the processing unit 504 that implement learning algorithms, some of which are known to those skilled in this art, and which will not be discussed in detail herein.

Another use for the learning unit 512 is to assist the autonomous device network to reconfigure itself. As discussed earlier, the autonomous devices are organized into reconfigurable networks which can be dynamically reconfigured as the need arises to optimize carrying out the mission of the network. Data collected by the autonomous device 100 and data exchanged between autonomous devices can be used to determine whether any of many configuration changes should take place. For example, it is a matter of decision as to the number of autonomous devices to be clustered into a single local network; it is also a matter of decision as to which of the autonomous devices in the local network will act as the lead device; it is also a matter of decision as to which autonomous devices will act as wings, if any. Decisions concerning organization and reorganization of the network of networks (NoN), described earlier, are enhanced with the learning unit 512 and the algorithms executing thereon. In some embodiments, these decisions are threshold-based, with pre-determined values of metrics corresponding to detection, match, or correlation data triggering the action.

As described above, autonomous devices can perform computations locally onboard the autonomous device processing units 504 and in other units as necessary. This aspect can in some instances provide certain advantages to the overall system of autonomous devices. For example, reliability and independence are assured because disabling a central processing unit does not put such a system out of commission. Also, if and when communication is lost between an autonomous device and other devices and subsystems, the autonomous device is still able to operate and process information on its own. Additionally, a system of autonomous devices, each of which can perform processing function thereon, can provide functions of distributed computing and any advantages thereof known to those skilled in that art.

One aspect of some embodiments includes the ability of an autonomous device to retain a representation of the entire network. For example, each autonomous device may store a table of values characterizing the last known condition or state of the network. These values may be in the form of numbers encoded into a memory element that correspond to the conditions the autonomous device was able to sense or measure in the environment, or values is relayed to the autonomous device by other devices or nodes. In the case of an informational environment, such as a communication network, the state information could include information indication of signal travel or delay times, branch congestion information, or other information related to the performance of the network or parts thereof. Additionally, each autonomous device may not only carry around this network/environmental representation information, but may also exchange such information with other devices locally and globally.

Information regarding the overall state of the network may be deposited by "visiting" agents or devices as they pass through nodes of a network, such as communication router nodes. The router nodes may further facilitate this process by storing the network state information at the nodes, or by passing the network state information in the form of data packets to other router nodes or to other autonomous devices in the network. One aspect of the present invention allows the routers' routing tables to be updated according to information carried by the autonomous devices, also referred to as autonomous agents or just simply as "agents" in this context.

The communication network, comprising router nodes and branch connecting the nodes can carry information on behalf of the agents, or carry the agents themselves, who store the information onboard the agents. It is possible, by monitoring the behavior of the network and agents and the network conditions, by way of at least monitoring one network condition, to determine, e.g., whether there is a security intrusion on the network. It is sometimes evident from correlated or extended signal travel times that such an intrusion is likely. This may be gleaned from processing the measured network condition information, in the form of data, with known or learned behavior templates.

The internal representation of the network's state, carried by the autonomous devices, can be in the form of an internal model or in the form of state variables, stored as described above. The precise nature of the internal model would depend on the nature of the network and the function being carried out by the system of autonomous devices operating in the network or system.

The effectiveness of such distributed autonomous device systems is sometimes a function of communication bandwidth and the amount of information exchanged between the autonomous devices. At one extreme, the autonomous devices can relay to every other autonomous device in the system every piece of information received on the individual autonomous device sensors in addition to all of the information obtained by the autonomous device through processing the sent signals. Such an exchange of information can sometimes overwhelm the processing and communication capabilities of a system. Thus, a multiple body communication problem is established, wherein the number of communication channels rises much faster than linearly with the number of autonomous devices in the system.

Also, if the autonomous devices exchanged a minimum amount of information between themselves, then such minimum information may not be sufficient or helpful enough to other autonomous devices to allow proper collaborative completion of a task. Hence, through actual and simulated use of such distributed communication systems, an optimum information exchange can be achieved or determined. This optimum amount of information exchanged between autonomous devices may depend on a number of factors, such as communication and processing system and subsystem capabilities, noise in the communication medium, the number of devices and targets or the ratio thereof operating in the environment, and other factors. The performance of learning algorithms can also be assessed through such simulations and practical applications of the distributed communication system.

Networks may be divided up into sub-regions and each region assigned to a subset of the total number of available autonomous devices, optionally in the form of autonomous vehicles patrolling the sub-regions. In some embodiments only a select device is in communication with other select devices from other sub-regions, e.g., neighboring sub-regions. Alternately, subsets of devices can be assigned to parallel tasks to collect information regarding different types of environmental signals. For example, one subset may operate on infrared signals and process the same, while another subset operates on radar or visible or acoustical or magnetic signals. The subsets may additionally communicate information with one another, optionally through select representative devices from each subset, as described above. Thus, separate but overlapping "societies" or subgroups can be performing search and identification tasks in parallel over the same domain.

Not only is performance of the distributed communication system dependent on the amount and type of information exchanged between the autonomous devices, but it can be a function of the systems composition and architecture as well. Such systems will behave differently depending on the number of targets and the number of autonomous devices and the numbers assigned to lead and wing autonomous devices as well. The present inventors have found that increasing the number of targets or increasing the number of wings available to each lead autonomous device result in complex dynamics and overall results. Such results are generally non-linear as a function of the parameter being varied. By constructing simulators and performing simulations, perhaps using the Monte Carlo method, a system can be optimized depending on the particular application at hand.

A system of autonomous devices, and the individual autonomous devices participating in the system can operate according to one or more modes of operation. The autonomous devices can change from one mode of operation to another, depending on the circumstance. The mode of operation may be decided locally by the autonomous device 100 using its learning unit 512 and/or its processing unit 504, as well as its control unit 500. The mode of operation may also be dictated to an autonomous device by an override communication signal, received by its communication unit 506.

The discussion which follows illustrates a number of exemplary modes of operation, designated as "Mode 0," "Mode 1" and "Mode 2."

Mode 0 operation is for autonomous devices operating substantially without any external direction or interference during the course of carrying out a task. In Mode 0, every autonomous device is acting on its own sensory inputs and processing decisions to locate, track or identify at least one chosen target. If multiple targets exist in the environment, several autonomous devices might be used, all operating in Mode 0, to locate and classify the targets. This may not be the most effective way to identify a set of targets because of a lack of coordination among the autonomous devices. In some cases, this operation provides some amount of redundancy and reduces the reliance of the devices on the other devices in the system.

According to one embodiment, in Mode 0 operation, an autonomous device only sends a communication to other devices when it has positively identified a target. Positive identification of a target is not meant to indicate a 100% probability, but is defined by a metric that satisfies a criterion. For example, if an overlap threshold is reached or if a probability criterion is met, then an autonomous device may decide that it has positively identified the target and relays this fact to other autonomous devices in the system.

Mode 0 can also serve as a baseline for a quantitative assessment of performance of a network of autonomous devices operating in other modes. To illustrate, the performance of the network while accomplishing a task in Mode 1 or Mode 2 (e.g. the speed with which it classifies all targets) can be compared to the performance of the network performing the same task while operating in Mode 0.

In some embodiments of Mode 0, the autonomous devices in the network do not exchange information, except to announce a target classification as described above, but they still avoid collisions with one another. This may be accomplished by the exchange of position or velocity data for each device, optionally by encoding this data into the occasional data exchanges passed between the devices, and may be improved or extended using probabilistic methods.

Since communication bandwidth is sometimes a limiting factor in system performance, the amount of information transmitted by autonomous devices can be limited by an adjustable parameter e, which ranges from complete transmissions of all overlap data to none at all. The introduction of this parameter allows the system to balance bandwidth considerations with, classification performance. Indeed, it is sometimes the case that too strong or too weak a cohesion between interacting devices can produce chaotic or suboptimal behavior.

An example of Mode 0 dynamics in the context of autonomous vehicles (AVs) is given below. Mode 0 establishes a baseline scenario for a reconfigurable network of AVs. It is similar to winner take all dynamics. At each time step, each $X_{j'}$ determines the values of its template overlaps $M_{ij}(t)$. Let $M_{i'j'}(t)=\max\{M_{ij}(t)\}$, the maximum overlap at time t for AV $X_{j'}$. Then, $X_{j'}$ adjusts its position $r_{j'}(t)$ by an amount $\Delta r(t)=r_{j'}(t)/W$ in the direction of the source component of S(t) most overlapping with template $T_{i'j'}$, such that $M_{i'j'}(t+1) \geq M_{i'j'}(t)$. Effectively, this update rule causes $X_{j'}$ to move towards a location where a source, matching template $T_{i'j'}$, may be present. The scalar W parameterizes the size of the incremental search area.

In Mode 0, the AVs act independently, and their updates in position and overlap occur synchronously. Hence, more than one AV may use the same maximum template to locate a putative source, since search (overlap) information is not shared among the AVs at each time step. Communication among the AVs only occurs when an AV reaches $\max\{M_{ij}(t)\} \geq \theta$. In this case, an AV is sufficiently close, in overlap space and possibly in physical space, to identify all or part of S(t) as containing one of the stored templates. At that moment, the AV in question emits a signal to all other AVs, and to command centers, that it has identified part of S(t). Subsequently, no AV, including itself, continues to maximize its overlap with that template (i.e., winner take all). The AVs continue to try and classify other aspects of S(t); however, the row(s) in M(t) corresponding to the template(s) already identified are eliminated from the process. Mode 0 terminates when $M_{ij}(t)$ values remain less than $\theta$ for a sufficiently long period of time (i.e., no further classification).

The bandwidth requirements for communication among AVs, excluding communications with command centers, are relatively small in Mode 0. Positional information $r_j(t)$ is transmitted, although not necessarily at each time step unless two AVs are close to each other (i.e., to avoid a collision). $M_{ij}(t) \geq \theta$ transmission is infrequent but critical, and will have considerably less bandwidth demands than transmission of positional information.

Mode 1 is the main Mode of operation of the system of autonomous devices. In this mode, the devices can be in a Search Mode 0r in an Acquisition mode. The main difference between Search mode and Acquisition mode is that in Search mode, an autonomous device updates its velocity vector randomly, while in Acquisition mode, a coordinated swarming with organized assignments is used. Autonomous devices may translate or vector towards their respective targets. Autonomous devices may switch between Search and Acquisition modes of operation.

In Search mode the autonomous devices move about randomly or quasi-randomly in the domain of operation in search of targets and continuously measure environmental signals. The signals received can be converted to numerical values or otherwise encoded. These values may then be stored and operated on and manipulated in any of a number of ways known in the mathematical and signal processing arts, to include arithmetic, algebraic, data structures, logic, pattern recognition, or other linear operations, such as those known in the field of linear algebra.

An autonomous device places the received source signals in an array, called the Source Array (S), with one entry (Si) corresponding to each (ith) active source. Recall that the environmental sources can be considered as targets in many cases, and this duality is used throughout this description, and what is referred to as a source is referred to as a target in other contexts. Generally, however, a "source" refers to a yet-unclassified signal emitter or scatterer, whereas a "target" refers to a source which has been associated with a target template that the devices have been or can be trained on.

The autonomous devices carry on board, or receive by communication, target templates. An overlap matrix (M) is calculated by each autonomous device from the scalar multiplication of S and target template T. According to one preferred embodiment:

$$S*T=M \qquad \text{Equation (1)}$$

M can be thought of as the inner product of S and T, indicating the overlap between the two vectors or the projection of one onto the other. Other embodiments include calculating a difference, absolute difference, or other distance between the signals and the templates.

Each autonomous device transmits its overlap matrix M to the other devices operating in the system, and in turn, receives from each of the other autonomous devices the overlap matrices generated by those devices. Each autonomous device then forms a summation overlap matrix that represents entries corresponding to the sums of all overlaps for a given source from all sensing devices.

If a source signal and a target template are within some distance of one another, then the source/target is considered to be identified. The following equation (Eq. 2) illustrates how each autonomous device (x) will sum over the overlaps with the jth target template according to one embodiment of Mode 1:

$$Mj=sqrt(sum(Mxj)^2))/n, \qquad \text{Equation (2)}$$

where n is the number of autonomous devices.

A target is said to be classified as a known target when either Mj exceeds a pre-determined threshold, $\theta$. Several ways of classifying or identifying targets are known to those skilled in the art. For example, reference information can be stored in look up tables on board a local or remote storage unit.

The autonomous devices can perform complicated computations locally on board the autonomous devices and then only transmit to other devices the result of said computations. The behavior of individual autonomous devices or the system in aggregate may or may not be deterministic. The identity of the exact autonomous devices that get assigned to exact corresponding targets is algorithmic, but since the system is highly dynamic, a predictable solution may never be reached per se. Also, a slight perturbation in any of the inputs or configuration parameters may result in a large change in the performance of a system or in the outcome results. In some cases it can be advantageous to introduce probabilistic noise and/or randomness into the process. Simulations can be used in some instances to test the effect of this noise or randomness on the system's performance.

In addition to different configurations of networks of autonomous devices, a network of networks can also be dynamically reconfigured according to the present invention. Devices which are members of one subsystem or smaller scale network may be diverted to operate as members of another subsystem or network according to the greater need of the system at any given time. Thus, in a dynamic system of autonomous devices, there may be a continuous shifting of roles and assignments being carried out by individual devices at any given moment. This is in part referred to as a configurable or reconfigurable system.

In some embodiments, each autonomous device can operate as a neural network, with the collection of autonomous devices forming a network of neural networks, as described earlier. Additionally, the autonomous devices may be considered weakly interacting members of a system.

Incomplete or missing data can be another debilitating factor in the performance of an autonomous device or system of devices. The present invention provides in some embodiments for ways to overcome or mitigate the detrimental effects of missing data. Such missing data may be the result of noisy communication channels or other interference which prevents sensing or collecting sufficient information to form a complete useful signal therefrom. Other reasons may include a situation where one or more autonomous devices is incapacitated or malfunctions. In that case, information kept on board such devices may be lost.

Next, the Acquisition mode is described. Rather than move about in random motion sensing and classifying what they come across, the autonomous devices can take on a more deliberate Mode of operation in the Acquisition mode. Here, the autonomous devices determine which device is to act as a lead device for which sources, and the lead device recruits one or more wing devices, as described earlier. Note that the system of devices may begin its mission in Search mode before switching over to Acquisition mode.

According to some embodiments, each autonomous device measures an overlap function between each environmental signal source and the corresponding target templates. Then, the physical displacement from the autonomous device to each of the sources is calculated, and the overlap for each source is divided by the displacement from the autonomous device to that source, and the results placed in a matrix. The matrix so formed is called the "decision matrix," and there will be as many decision matrices as there are sources. The decision matrix is usually derived from the overlap matrix. One embodiment has the decision matrix as the overlap matrix divided by the respective distances to the respective sources/targets. This procedure avoids the situation where an autonomous device is chosen as the lead device for a source solely on the basis of having the largest overlap with that source. This way, the geographic proximity is taken into account as well as the signal overlap when deciding which autonomous device is to take the lead in tracking a given source. Preferably, no autonomous device is in Acquisition mode for more than one source at any given time. This is especially true for Modes 1 and 2.

Additionally, this mode involves the assignment and selection of wing autonomous devices. A lead autonomous device may recruit at least one wing autonomous device. Usually, the wings are recruited based on physical/logical proximity to a target. The first tier of wing autonomous devices is called the "wing-one" autonomous devices. Then if resources permit, another tier of autonomous devices is recruited, called the "wing-two" autonomous devices, and so on. The order of recruitment is thus wing-one, wing-two, wing-three, etc. One embodiment uses only two wings per lead autonomous device, with extra devices going back into Search Mode.

An iterative process, wherein each autonomous device incrementally updates its position and velocity vectors and moves towards its assigned target is undertaken until the normalized overlap metric exceeds a pre-determined threshold, as described above at Eq. 2.

Autonomous devices may be dynamically reassigned. The system of autonomous devices as a whole can operatively reassign the constituent autonomous devices to the benefit of the overall mission. In a first example, an autonomous device operating in Search mode wanders very near an active source while others are operating in Acquisition mode. The Search mode autonomous device may alert the other devices in the group and take on the role of a wing autonomous device for that source in place of one of the devices originally operating as wings for that source.

In another example, the lead autonomous device or one of its wings may become incapacitated or drop out of the network for some reason, for example upon destruction or loss of power or communication ability. Then, an unassigned or a Search mode autonomous device can take over the job of the incapacitated autonomous device. This capability adds significant robustness to the system.

In yet another example, if a source has been classified, then one or more of the autonomous devices having originally been assigned to classifying that source can now be relieved of its duties and switched to the task of assisting other autonomous devices. This can accelerate the process of classifying the later-classified sources because more autonomous devices are freed up to assist in the task of classifying the remaining sources. That is, the ratio of autonomous devices to yet-unclassified active sources increases.

When all active sources have been identified and/or classified, the autonomous devices are usually returned to a Search mode and move about in their sensing and random translation activity, awaiting further instructions or in search of new sources to appear, such as pop-up sources.

An example of Mode 1 dynamics is given below in the context of autonomous vehicles (AVs). Mode 1 implements a weakly interacting dynamic among the AVs. At each time step, each $X_j$ determines its overlaps $M_{ij}(t)$, and transmits those values exceeding a noise threshold, $\epsilon$, to all the other AVs. This has the effect of distributing, in real time, information throughout the network concerning partial classification of S(t). Unlike the situation for an individual AV described in Mode 0 dynamics among multiple, yet essentially independent, AVs described earlier, classification in some embodiments of Mode 1 is not determined exclusively by $M_{ij}(t) \geq \theta$. Instead, classification can also occur when $$\sqrt{\sum_{j=1}^{N}(M_{ij}(t) \geq \varepsilon^2}\Big/n \geq \theta.$$

Here, $n \leq N$ AVs, each having an overlap exceeding the noise threshold $\epsilon$, may serve to classify a component of S(t). No single overlap necessarily exceeds the classification threshold, $\theta$.

The effect of distributing partial classification information is to allow cooperative search efforts at the network level. Coherent behavior among AVs can enhance the speed of classification, optimize performance, and predict dynamic reconfiguration patterns among the AVs prior to an event taking place (e.g., source identification). The trade-off with improved performance is bandwidth required for communication among the AVs. In addition to positional information, $M_{ij}(t)$ data needs to be transmitted in real time. The extent of such data transfer is primarily a function of $\epsilon$ (i.e., noise threshold).

To see how $M_{ij}(t)$ information factors into the cooperative behavior of the AVs, consider the dynamics where, at time t, each $X_j$ compares its $M_{ij}(t) \geq \epsilon$ values across j. The AV, $X_{j'}$, with max$\{M_{ij}(t)\}$ is termed the lead AV, associated with the perceived component $T_{ij'}$, of S(t). $X_{j'}$ adjusts its position $r_{j'}(t)$ by an amount $\Delta r(t) = r_{j'}(t)/W$ in the direction of the source component of S(t) most overlapping with template $T_{ij'}$, such that $M_{ij'}(t+1) \geq M_{ij'}(t)$. This is similar to the update rule in Mode 0. However, in Mode 1, the max$\{M_{ij}(t)\}$ values are determined across AVs (index j) rather than across templates (index i) within individual AVs. The result is that individual AVs in the network are identified as lead AVs at opportunistic times. This transiently specializes AVs, and diminishes duplication of tasks, as in Mode 0.

If at any time there are $X_j$ that do not have a maximum overlap with any template (e.g., more AVs than templates embedded in S(t)), then AVs may temporarily be assigned the role of wing AV, which augments the classification of a source component by a lead AV. Wing AVs are ranked by their proximity to source components attempting to be classified by lead AVs. Each lead AV can be assigned K wing AVs. Those AVs remaining after lead and wing assignments are implemented at time t conduct a random search pattern. These AVs are available for lead and/or wing roles depending upon S(t) and the dynamic reconfiguration of the AV network.

The system of AVs is further capable of detecting and coping with intermittent transmissions of various source components. Should any components of S(t) discontinue emission for any reason the AV system reconfigures itself by reallocating those AVs involved to other unclassified source components. Should any or all of the intermittent source components begin emitting at some later time, the AV system once again reconfigures itself for optimal classification of the new S(t) and reallocate appropriate AV system resources.

For new additions to S(t), i.e. source components that have no corresponding learned target template, the AV with the greatest overlap, max$\{M_{ij}(t)\}$, with the novel component, trains on the new source component to provide a new target template $T_{ij'}$, which is disseminated to all other AVs.

Sometimes, the system may be required prioritize tasks, such as deciding which targets are more important than others, and how to deal with these targets. The AVSYS is capable of prioritizing and acting on specific tasks. Target priorities, e.g., range from one to five, five being the highest priority, are designated specific system responses. For example, a source exhibiting a target signature with a priority rating of five, requires that all AVs attempt to acquire and classify the source. For a priority level of three, only half of the available AVs are assigned to the source and so on, until priority level zero, which denotes normal operation.

The following is a specific example, given in terms of a simulation using software according to the AVSYS Mode 1, and is extensible to other embodiments by those skilled in the art. To illustrate how coherent behavior occurs in a search by AVs operating in Mode 1, consider an ideal case where there are ten AVs, and each AV has been trained on the same set of templates. Ten templates in this set each match an emitter, and S(t) embeds information about these emitters. For demonstration purposes, the emitters, or component sources, are assigned random topographical locations that remain fixed for the duration of the simulation. The initial starting configuration of the AVs are chosen randomly and each lead AV is allowed up to K=2 wing AVs. Communications among the AVs assumes $\epsilon=0$, and with zero noise, n=N, so that all AVs contribute, in principle, to classification of each source. At each time step, maximum overlap information (10 $M_{ij}(t)$ values per AV*9 AVs) is transmitted among AVs (An AV does not transmit overlap information to itself). Since in the upper limit of noise ($\epsilon=1$) no information is transferred between AVs, only the AVs own overlap will be used in determining classification. For this situation the threshold must correspond to the Mode 0 case where $\max\{M_{ij}(t)\} \geq \theta$. Furthermore, when the noise falls between these two extremes, overlaps of individual AVs may correspond to the above condition. In either case if the lower classification (highest discrimination) threshold is set to be equal to, e.g., one Hamming distance, $\theta$ will be equal to 0.9 in terms of the overlap between the source, S(t) and target template, Tij, vectors. Since the sum of the squares of the overlaps is normalized, the Mode 1 threshold value is the same as the individual threshold. In the example the Mode 1 overlap threshold $\theta$ is 0.45. However, as discussed above, should any AVs individual overlap exceed the equivalent Mode 0 overlap threshold of 0.9, then the source will be considered classified.

In FIG. 7, dynamic reconfiguration among the AVs is illustrated for a network of ten AVs searching for ten target sources. Initially, each AV is a lead AV assigned to a single source (FIG. 7a). By the third iteration, one target has been identified. The lead AV that identified the target becomes the lead AV for a second target, rather than becoming a wing AV (FIG. 7b). There is internal self-reorganization within the network, resulting in the identification of three targets by sixth iteration (FIG. 7c). All targets in the system become classified shortly after the ninth iteration (FIG. 7d).

FIG. 7. Illustrates exemplary Mode 1 dynamics. Open squares represent unclassified sources, closed squares represent classified sources, and crosses represent AVs. a) At t=0 all AVs have been delegated as lead AVs for each source. As indicated by the solid red line, AV 1 is acquiring source S0. b) At t=3 source S0 has become classified, that is, the overlap of AV1 exceeded the threshold $\theta$=0.9. AV1, the lead AV, is now used to acquire another source, S4, indicated by the solid red line. However, the system determines that instead of being a wing it should become the lead AV. Furthermore, the AV originally assigned to S0 (dotted red line) is reassigned to S1 along with AV2, shown by the solid red lines. c) At t=6 three more sources have become classified, that is, for each classified source, one of the AVs normalized sum of squares across all AV overlaps has exceeded the Mode 1 threshold of 0.45. The AVs are reassigned from their previous sources (dotted red line) to new sources (solid red line) as either lead or wing AVs. d) At t=9 only one source remains to be classified and three AVs, one lead and two wings, are assigned to the source.

We now turn to Mode 2 and its dynamics. An example of Mode 2 dynamics is given next in the context of autonomous vehicles (AVs). Mode 2 is a more aggressive Mode of operation, where AV source component overlaps that have greater clarity (i.e. larger overlap) are assigned greater weight in summation. Prior to summation the AV overlap for a given target are ranked in 1o descending value. A series function is then applied to the rank that exceed the noise threshold, $\epsilon$ and compared to a classification threshold, $$\sum_x ((M_x^j(t)) \geq \varepsilon)^{(1+\delta x)}$$

where $\delta$ is presently set to 0.5 and x is the index of ranked overlaps for target is template j If $$\sum_x ((M_x^j(t)) \geq \varepsilon)^{(1+\delta x)} > \gamma \theta$$

Here $\theta$ is a predetermined threshold as before and $\gamma$ is a composition factor determined from the series parameter $\delta$, the source is said to be classified as a particular target. As in previous modes, classification of a source component also occurs for any AV when $M_{ij}(t) \geq \theta$.

While Mode 1 is consensual in nature, Mode 2 can provide is faster classification with the caveat that the classification might have less resolution than Mode 1.

Dynamical reconfiguration of a system into distinct networks of autonomous devices serves to optimize the search and acquisition of sources and may also increase the stability of the system by introducing distinct spatial factors. Recall that the lead autonomous device is selected on the basis of its overlap with a particular source but wing autonomous devices are chosen by their proximity to a source. This differentiation of selection provides separate means of designating autonomous devices and forming networks offering a protection against any possible confirmation-bias in the lead autonomous devices. Lead autonomous devices with large overlaps with a particular source may be far away whereas wing autonomous devices may be closer but inhibited by network conditions.

Figure 8A:
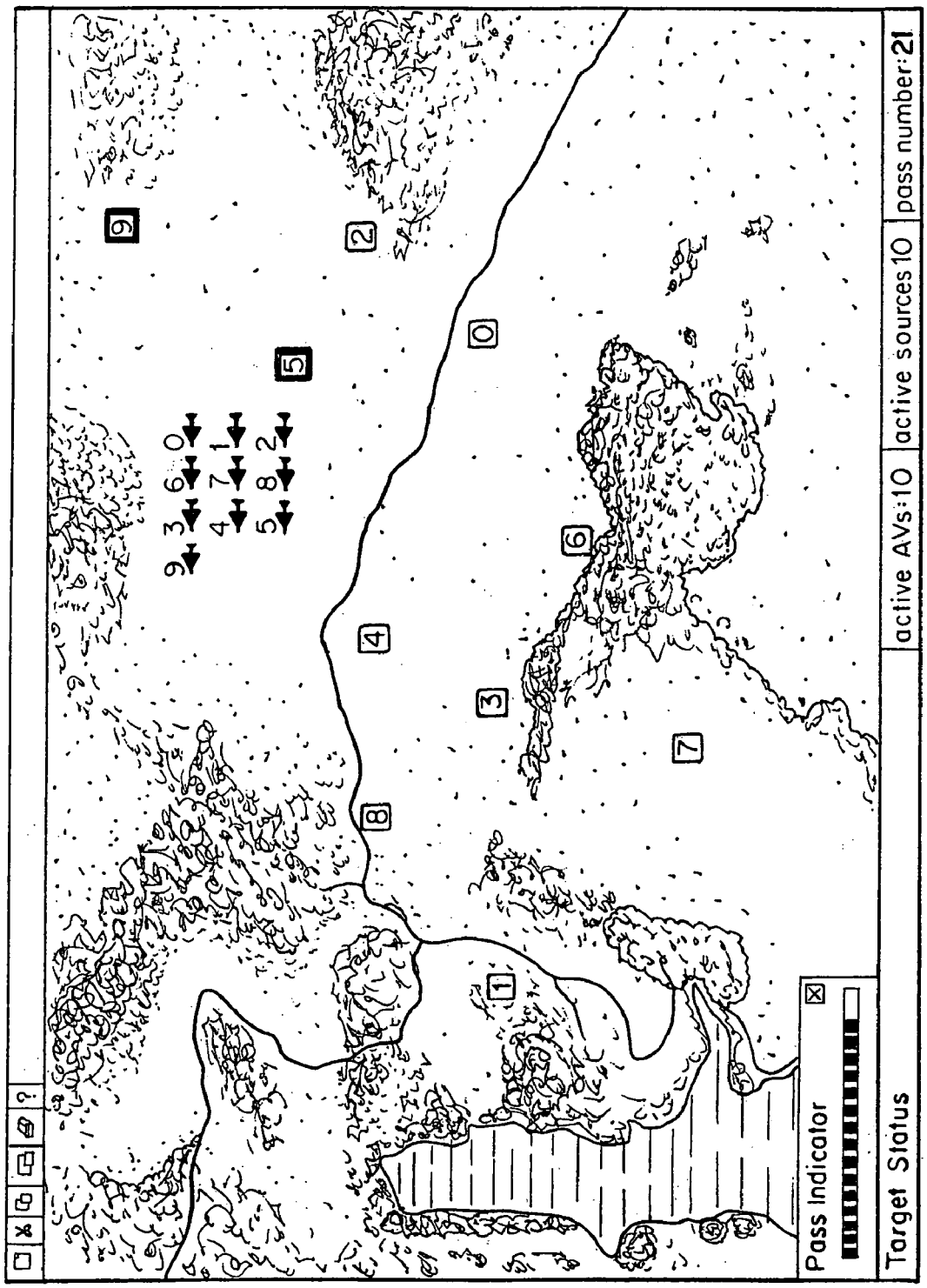
FIG. 8 shows an exemplary result of a simulation exploring the performance of a system in various configurations under various conditions.
Figure 8B:
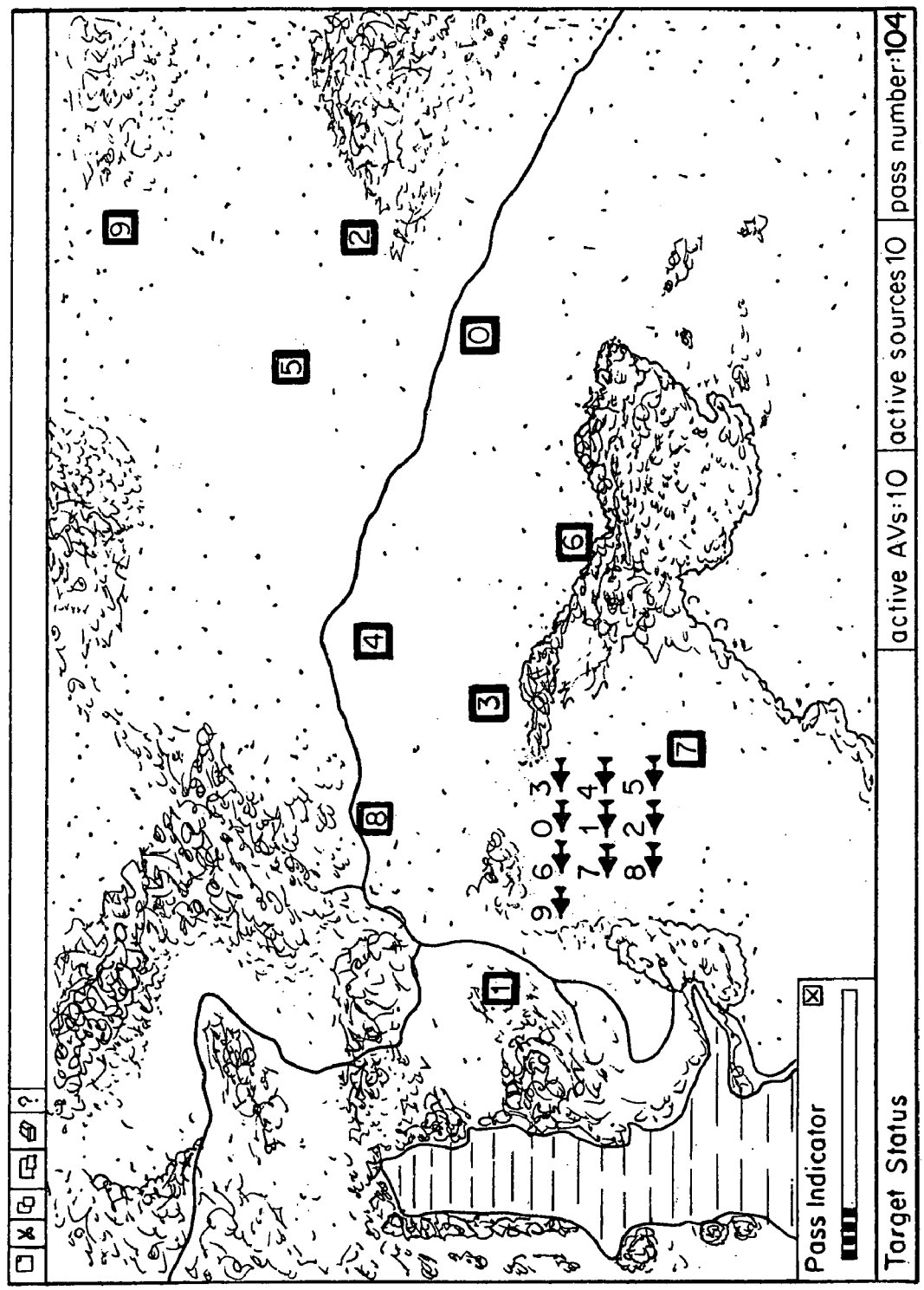

A "grid search mode" consists of autonomous devices moving in a formation executing a search pattern. FIG. 8a, b show the grid mode time sequence. As the formation moves across the designated search area nearby sources whose normalized sum of overlaps across the system of autonomous devices exceeds a threshold become classified. As the system makes its way down the search area more sources become classified until, finally, the signal received by the furthest sources become classified.

The performance of the modes was analyzed in terms of the classification completion time for a range of classification and information parameters. The classification threshold, $\theta$, is represented as overlap in the range of zero to one, an overlap of one being an exact match between the target template and source component for a particular emitter. The information threshold, $\epsilon$, is represented as overlap in the range zero to one, one being full transmission of overlap data between AVs.

Mode 0 describes an autonomous set of AVs attempting to classify a random spatially distributed set of emitters. The only communication between the AVs is when a source is classified as a particular target to reduce search redundancy. In comparison Mode 1 describes a set of coherent weakly interacting AVs. FIG. 4 compares these two distinct modes of behavior for a set of ten sources and ten AVs. For Mode 0 the classification threshold is equivalent to an overlap of 0.95, whereas for Mode 1 the system classification threshold is equivalent to an overlap of 0.8 although AVs can classify on an individual basis with an equivalent threshold of 0.95. For Mode 1 the majority of sources have been classified by the end of the fourth pass with task completion occurring at the end of the fifth pass. In comparison to Mode 0, the majority of sources are not classified until the fifth pass; complete classification occurring after ten passes. Mode 1 classification of sources begins and ends earlier than individual Mode 0 classification.

Figure 9:
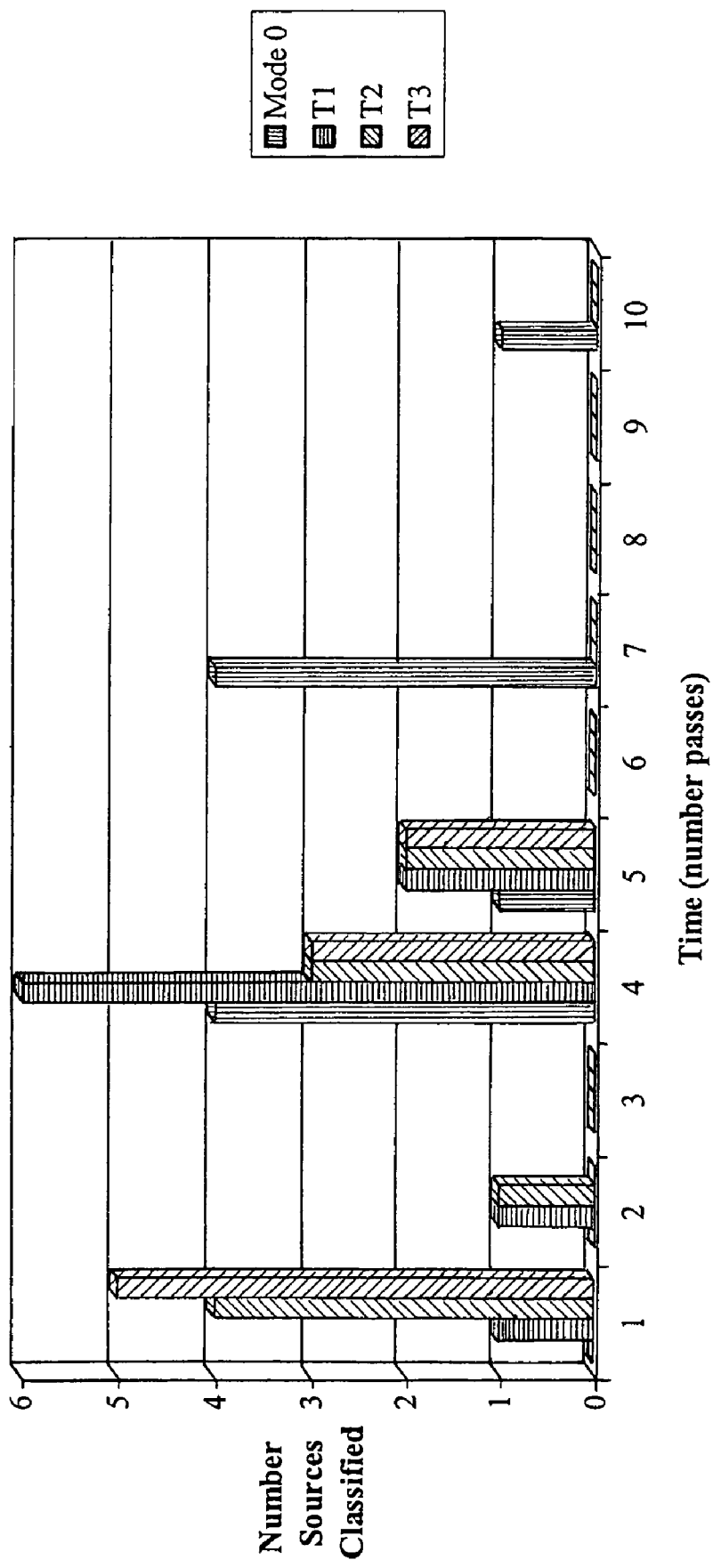
FIG. 9 shows exemplary behavior of Mode 0 and Mode 1 for different thresholds.

FIG. 9 describes the behavior of the two modes for different thresholds. Threshold T1 describes the same classification threshold as above with an overlap-equivalent of 0.8. Thresholds T2 and T3 describe less discerning thresholds with overlap-equivalents of 0.6 and 0.4 respectively.

The graph demonstrates how, as the threshold becomes less discriminating, the earlier the classification begins. For threshold T3, the least discriminating of the thresholds, half of the sources are classified after the first pass, compared with only 10% for the most discerning threshold. Sometimes, less stringent system classification thresholds provide faster initial classifications but this performance advantage diminishes over time.

Figure 10:
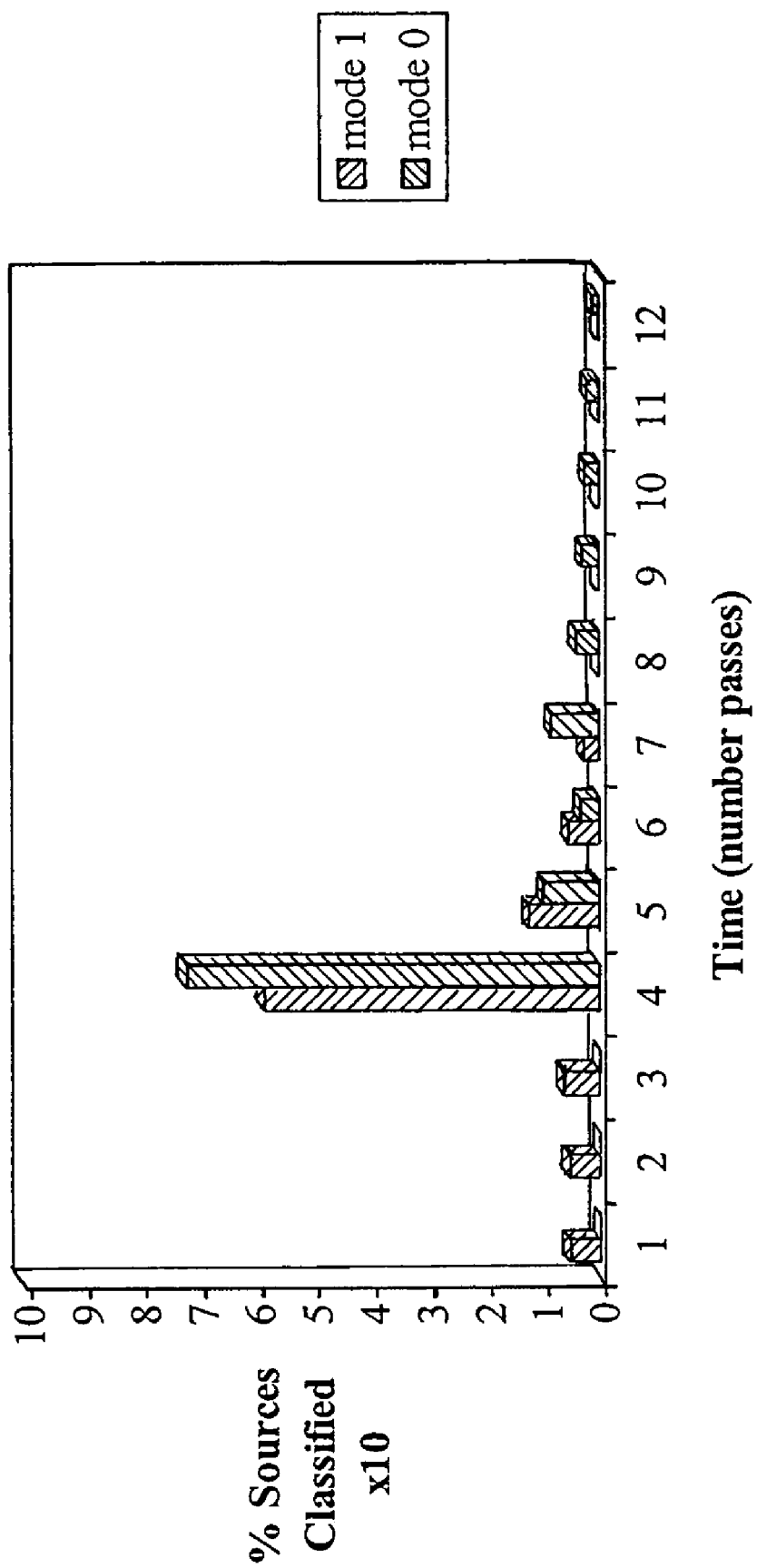
FIG. 10 shows an exemplary average classification time for Mode 0 and Mode 1 over a range of numbers of sources.

In many search operations, the ratio of sources to AVs will be about unity. We now consider the performance of the system as this ratio diminishes. FIG. 10 illustrates the average classification time for Mode 0 and Mode 1 over the entire range of numbers of sources. This illustrative result shows the enhanced performance of Mode 1 over Mode 0. Mode 1 on average begins classifying sources earlier than Mode 0 and is overall faster to completion.

Figure 11:
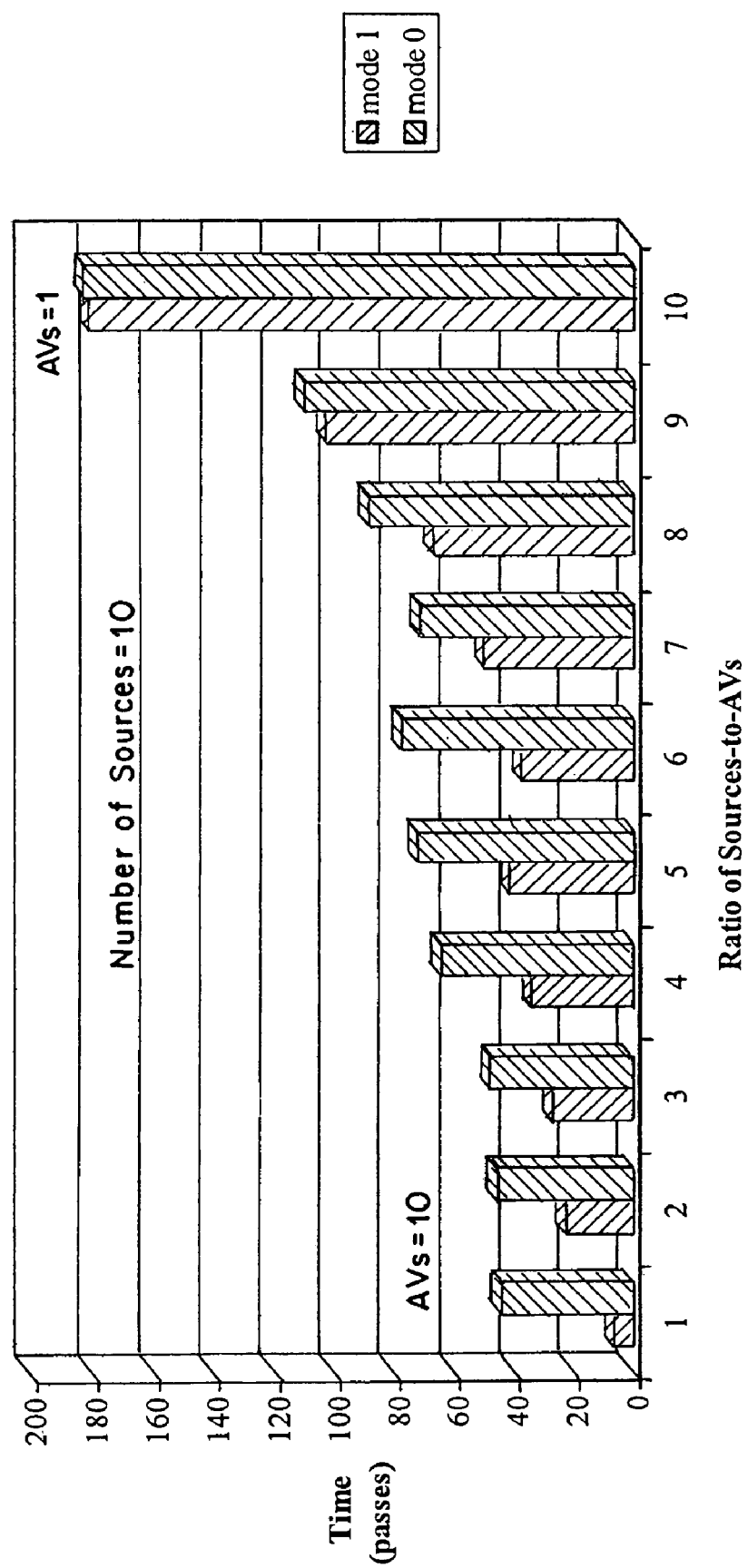
FIG. 11 shows an example of classification performance as the AV to source ratio decreases for both Mode 0 and Mode 1.

So far classification performance has only been considered for a fixed unitary ratio of AVs to sources. FIG. 11 shows the classification performance as this ratio decreases for both Mode 0 and Mode 1. With an initial ratio of unity, Mode 1 outperforms Mode 0 by a time factor of approximately 8-to-1, completing classification of the sources in approximately 5 passes compared to Mode 0's completion time of approximately 40 passes. As the ratio of AVs to sources is reduced, however, not only does the classification time for Mode 1 begin to lessen but the classification performance margin between Mode 1 and Mode 0 diminishes. In the extreme, where the ratio of sources to AVs is 10 (one AV to ten sources), the classification time is at its greatest and the disparity between the two modes almost vanishes.

Both of these behaviors, the attenuation in performance and the disappearance of operational disparity, is expected. In the former case the reduction in the number of AVs in Mode 1 operation means there are less AVs available to acquire sources. This is relevant in initial classification where some sources will have no AVs attempting to acquire them. In the latter case of diminishing disparity between the modes it is clear that as the ratio approaches its maximum value the system degenerates to Mode 0 operation. In the extreme where Mode 1 has only one AV this is equivalent to Mode 0. It should be remembered that these exemplary results are only given for the purpose of illustration, and actual system or simulation results will depend on many factors, as discussed elsewhere in this document.

Figure 12:
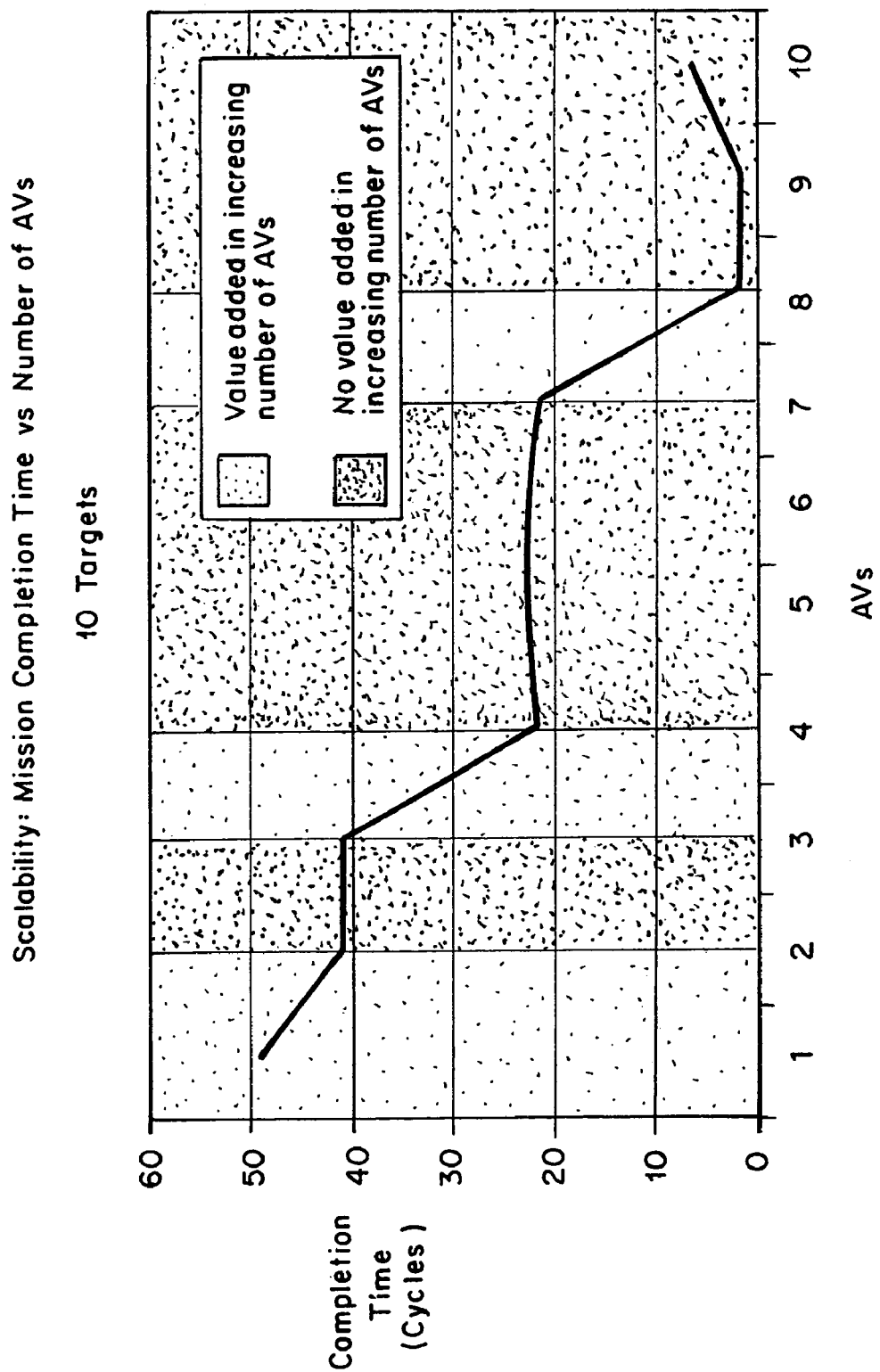
FIG. 12 shows an exemplary scalability performance curve having nonlinear performance as a function of the number of AVs in the system.

The result obtained by varying the number of AVs leads to an interesting observation. Considering only Mode 1 performance with a reduced classification threshold, as shown in FIG. 12, it becomes clear that the classification performance is not necessarily a linear function of the number of AVs in the system. Indeed the relationship exhibits step-wise features. This type of behavior implies scalability of the system. In other words, the added value of introducing AVs into the system is dependent on the state of the system at the time. For example, consider the initial situation where there is only one AV and classification time is at its highest. If another AV is introduced the system performance increases. However, there is no added value in performance if a further AV is introduced. If yet another AV is added, bringing the total to four AVs, there is a sudden increase in performance and therefore considerable added value in the extra AV. A similar pattern is observed during the introduction of the next three AVs. Here there is no added value in introducing AVs until a seventh AV is introduced whereupon a further transition is seen.

Such critical transitions are observed elsewhere in nature and are often a feature of self-similar systems, which also exhibit scalability. In the AV system the transitions observed with the addition of single AVs at critical points indicates similar scalability. A possible mechanism for scalability is the K=2 wing implementation. Further investigation into this matter with varying K wings will be necessary before any firm conclusions can be reached. However, the emergence of scalability implies the possibility of predicting how large systems will behave for given AV-source ratios. The linearity of the scalable regions implies a degree of system stability.

Some exemplary search systems have the ability to prioritize tasks, such as deciding which targets are more important than others, and how to deal with these targets. Target priorities may be given values, ranging from zero to five, five being the highest priority. For example, a source exhibiting a target signature with a priority rating of five requires that all AVs attempt to acquire and classify the source. For a priority level of three only half of the available AVs are assigned to the source and so on until priority level zero, which denotes normal operation.

Figure 13:
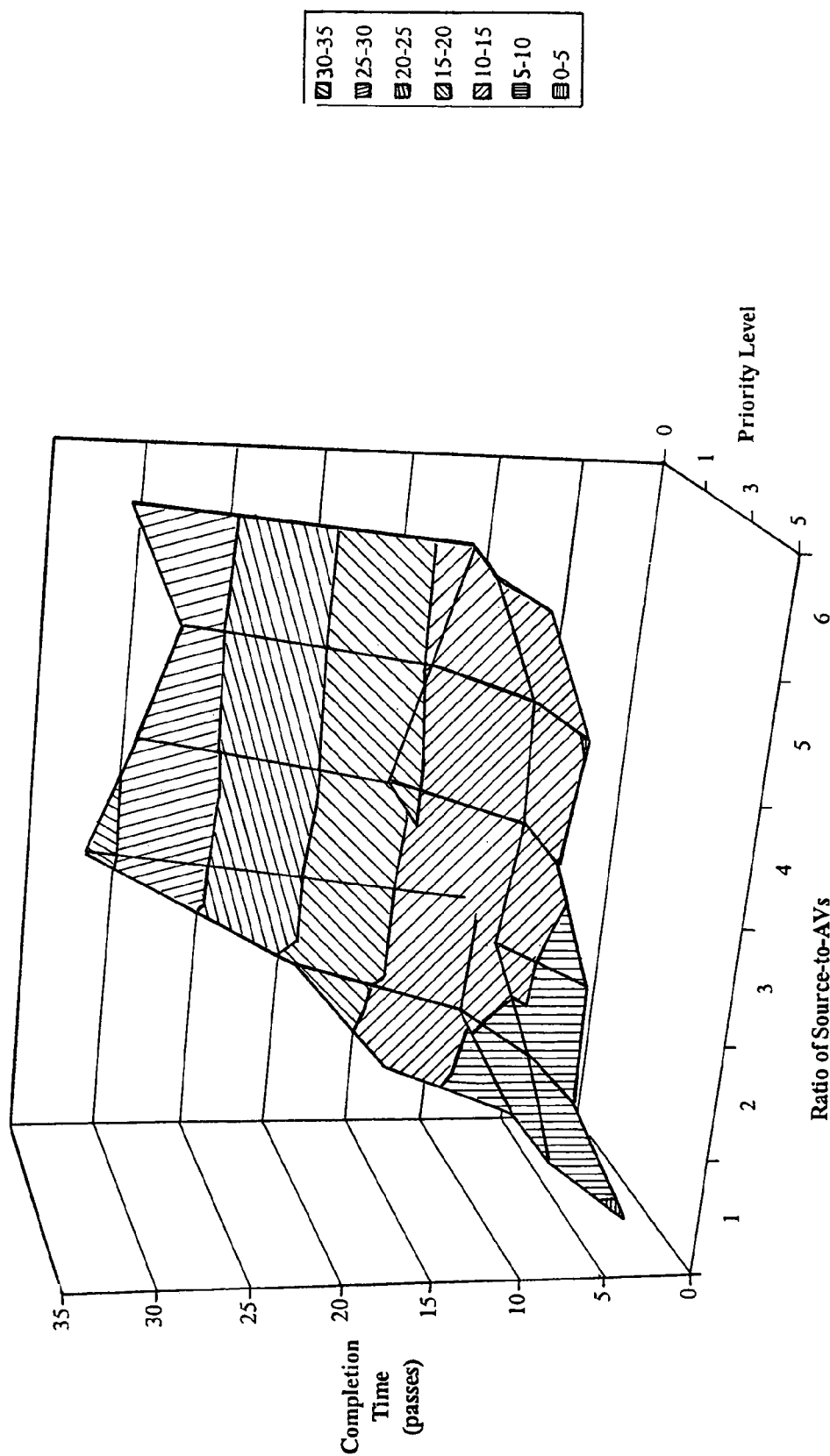
FIG. 13 shows exemplary system performance as a function of priority level and the ratio of AVs to sources.

FIG. 13. shows system performance as a function of priority level and the ratio of AVs to sources. The "priority" axis increases in precedence from 0 to 5. Each point on the priority axis for a particular source-to-AV ratio indicates the time taken to classify a randomly chosen source with that particular priority level. When the ratio of sources to AVs is unity the time required to complete classification of all sources increases as a function of the priority level of the sources. However, as the source-to-AV ratio increases (i.e. the number of AVs decreases) there is a marked increase in the completion time as a function of priority level for sources with lower level priority. While for higher-level priority sources, for example, priority level five, there is an increase in completion time for higher source-to-AV ratios, the system is still able to classify these sources relatively quickly. This is because, in the case of priority level five, all AVs converge on the source so there is less difference in completion time for various source-to AV ratios compared to less important sources where reduced numbers of AVs converge on the source. In the extreme case of priority level zero, where only one AV is assigned to a source, and where there is a high ratio of sources to AVs, the likelihood of there being an AV assigned to the low priority source is low resulting in a large completion time. High-level priority sources are less affected by decreased numbers of AVs in the system than are lower-level priority sources.

Figure 14:
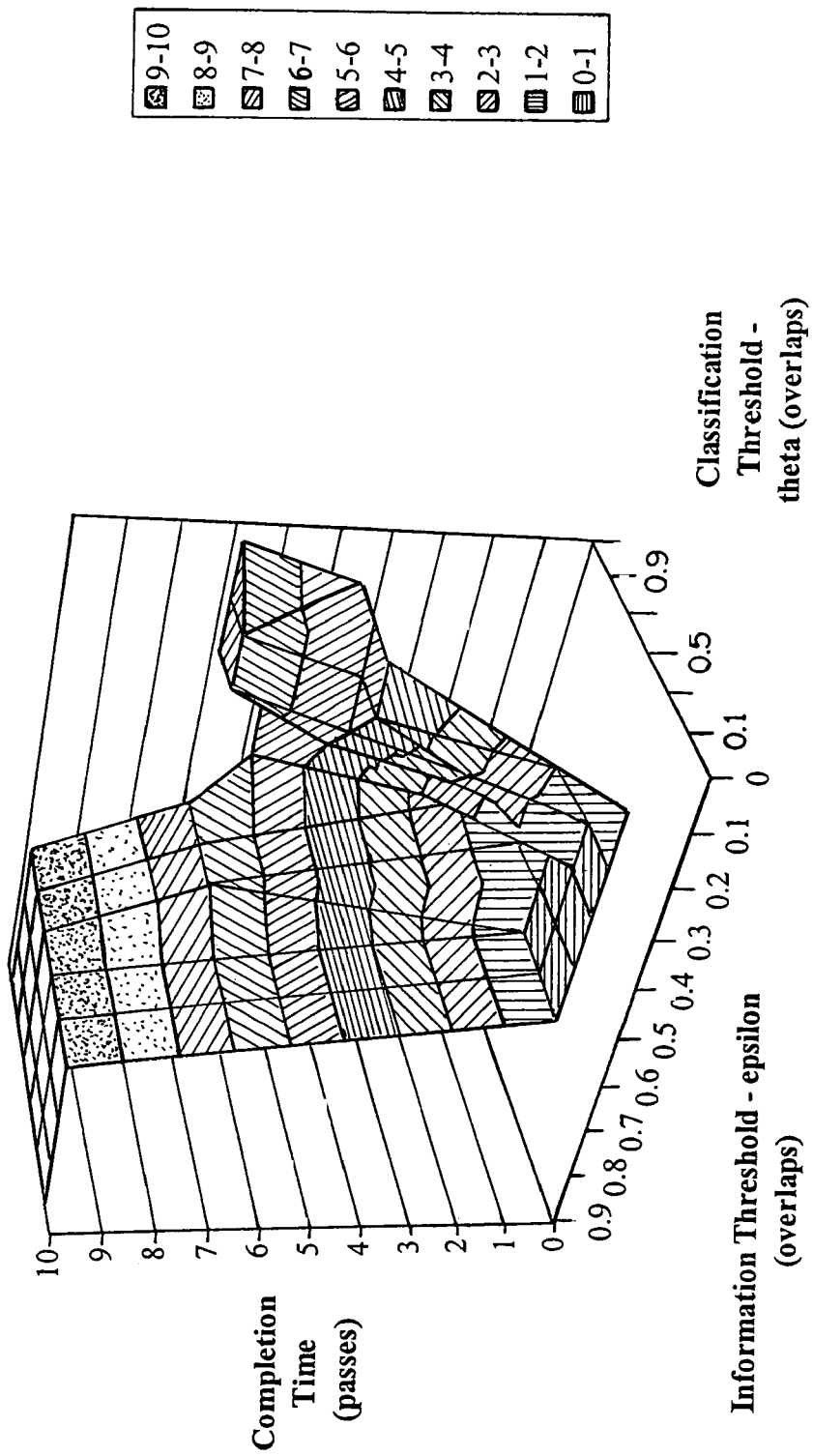
FIG. 14 illustrates exemplary system classification performance characteristics as a function of both the classification threshold and the information threshold.

FIG. 14 illustrates the system classification performance characteristics as a function of both the classification threshold and the information threshold. While the classification threshold determines the degree of discrimination of source classification, the information threshold determines the amount of information communicated between AVs. The classification threshold, $\theta$, is represented as overlap in the range of zero to one, an overlap of one being an exact match between the target template and source component for a particular emitter. The information threshold, $\epsilon$, is represented as overlap in range zero to one, a zero overlap threshold being full transmission of overlap data between AVs. Completion time is represented by passes, one pass being a complete update of the system in terms of overlaps and AV-to-source displacements. For this simulation, completion time passes have been bound for graphical scaling.

For a system with all overlaps transmitted and a classification threshold set to the overlap equivalent of 0.95, the completion time is approximately 7 passes. This classification threshold demonstrates a high level of discrimination, which, as can be seen from the graph, requires significantly longer time to achieve. At such discrimination levels, however, Mode 1 degenerates to Mode 0. Setting the system threshold to the equivalent used in Mode 0 annuls the consensual aspect of the system. This effectively means AVs classify targets on an individual basis before any consensual classification occurs.

The graph illustrates how, as the classification threshold discrimination requirement is relaxed, the completion time diminishes. In the extreme, where the threshold is set to a very low equivalent overlap value, the classification completion time for the system is reduced to only one update pass. Essentially, as the discrimination threshold is relaxed, the consensual aspects of the system become more prominent since the averaging of the overlaps across all AVs identifies source components before individual AVs can classify with their more stringent threshold.

For a particular classification threshold, for example, a threshold equivalent to an overlap of 0.5, the completion time varies with the amount of information shared between AVs. When all overlap information is available to all AVs the classification time is approximately 5 to 6 passes for the given classification threshold. However, as the amount of information being shared between AVs decreases the classification time begins to decrease rapidly until limiting occurs. This linear region persists for a significant range of $\epsilon$ until, at some lesser value of $\epsilon$, the completion time begins to rise.

This initial increase in classification performance may, in some cases, be understood in terms of the increase in the information threshold reducing 'noise' from some AVs. This noise is in the form of overlap values from AVs for source components that are no better than random. This preclusion of 'outliners' increases the value of the normalized sum of squares across the AVs for a particular source component thereby reducing classification time for that particular component.

At too great a value of $\epsilon$, the limited transfer of useful data annuls the noise inhibition. At this point the classification time rises rapidly, as can be seen in the graph. When the noise threshold reaches the point where no overlap data is transferred the situation becomes similar to Mode 0, the only difference being the classification threshold setting. However, if this threshold is set to an equivalent overlap of 0.95 the situation is equivalent. This situation, where the information threshold is zero and the classification threshold is 0.95, therefore gives a baseline for Mode 0 operation and is realized in the graph as the z-axis.

Figure 15:
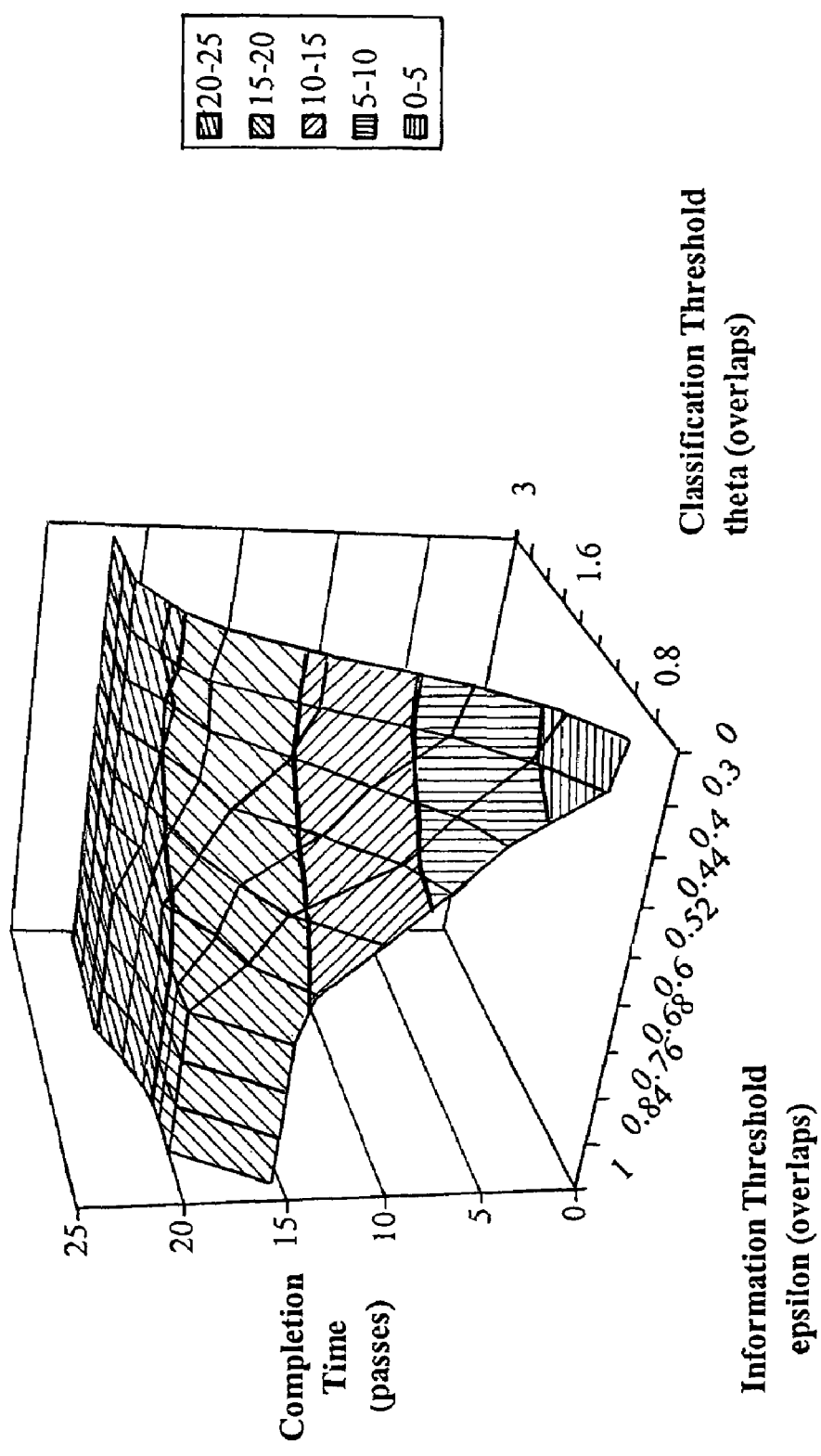
FIG. 15 shows some exemplary completion time results from a simulation of Mode 2 operation.

Exemplary Mode 2 results are shown in FIG. 15. The information threshold scale is as before in Mode 1. Since the summation is a series function, the threshold equivalent overlap can exceed unity. For this reason the classification threshold in some embodiments is set in the range of 0 to 3.5.

Looking at how the completion time varies as a function of classification threshold, with zero noise level, a threshold with low discrimination shows a rapid completion time of less than 2.5 update cycles. However, as the classification threshold becomes more strict, the completion time increases and continues to rise until the system begins to classify on an individual basis, i.e. as in Mode 0. At that point the rate of increase in completion time begins to decrease, finally limiting when the threshold falls below the Mode 0 classification threshold and classification of source components is exclusively performed by individual AVs.

In some embodiments, when the information threshold is increased, thereby reducing the information exchange in the system, the performance of the system is further affected. For a classification threshold value of 0.5 with no noise threshold, the completion time is a little above 5 update passes. However, as the information exchange throughout the system is slowly reduced the completion time rises until it limits at approximately 20 passes. At that point no further decrease in overlap exchange between AVs makes any difference to performance. Since, at this point, AVs are receiving information from, perhaps, only one other AV, classification is mainly performed on an individual basis.

Other values of classification threshold follow a similar trend with the exception of values that create saturation of completion times. Classification threshold values that fall in the linear range remain more or less in that range for average $\epsilon$ values. Within this range of classification and noise thresholds, reduction of information exchange in the system does not substantially deteriorate system performance. Limitation of bandwidth therefore is possible without unacceptable detrimental performance effects on the system. Again, it is emphasized that the present examples represent results of simulations designed to illustrate various aspects of the model, and that other outcomes are possible for other run conditions.

A classification performance comparison between AVs executing a grid formation search and Mode 1 operation was made for a fixed classification threshold with no attenuation of communication bandwidth. Both systems were configured for equal source signal reception as a function of distance and equal AV-to-source distance increments for each cycle update. Source classification thresholds and methods were the same in both cases.

The results for a random spatial distribution of emitters show Mode 1 classification performance in terms of completion time was on average ten times faster than the grid Mode of operation over a sample set of ten trials.

This result may be explained for passive searches of high-energy active sources. Since the signals of the sources can be received anywhere within the given search area the advantage has to be with a random search pattern covering the entire area rather than with a formation in a moving yet constrained area at any given moment in time. This is clearly seen in considering how classification of a source occurs; for the grid formation, sources will only be classified when the formation is within a proximity of sufficient signal strength, leaving distant sources (for example, those on the opposite side of the search area) unclassified until the formation moves to within a sufficient range. However, for passive searches of low-energy active sources, such as short-range visible radiation, or for active searches of passive sources, such as sonar searches for objects on the seabed, a grid formation search may be more applicable.

While only certain preferred embodiments and features of the invention have been illustrated and described herein, many modifications and changes will occur to those skilled in the art. It is, therefore, to be understood that the appended claims are intended to cover all such modifications and changes as fall within the range of equivalents and understanding of the invention.

What is claimed is:

1. A system comprising:
    first and second autonomous devices for collaboratively identifying objects in an environment, each autonomous device comprising:
        a sensor unit adapted to sense information relating to an object;
        a storage unit containing object template information corresponding to the object;
        a computation unit adapted to process the sensed signals, wherein the computation unit comprises an algorithm to compute a degree of match between the sensed signals and the object template information;
        a communication unit adapted to communicate information relating to operation of the autonomous device with other devices;
        a control unit adapted to make a decision affecting a status of the autonomous device based at least on a result of the computation of the degree of match; and
        a mobility unit, which receives instructions from the control unit, and is adapted to move the autonomous device from one location to another;
        wherein the autonomous device is adapted to automatically move to increase the degree of match between the sensed signals and the object template information; and
        wherein the computation unit is adapted to identify the object by determining that the degree of match has exceeded a predetermined threshold;
    wherein the first autonomous device directly transmits information relating to the object to the second autonomous device, and the second autonomous device reconfigures itself in space, without human intervention, based at least in part on said transmitted information; and
    wherein at least the first and second autonomous devices operatively collaborate to identify the objects in the environment.

2. The system of claim 1, further comprising a positioning unit adapted for determining the position of the device in the environment.

3. The system of claim 2, wherein the positioning unit comprises any one of:
    a global positioning system (GPS), an inertial navigation system and a signal beacon guided system.

4. The system of claim 1, further comprising a learning unit which executes machine learning algorithms that improve an ability of the autonomous device to classify objects.

5. The system of claim 4, wherein the learning unit is adapted to execute new algorithms or use new data tat was not initially loaded into the learning unit.

6. The system of claim 1, wherein the autonomous device is a member of a network of autonomous devices which can communicate over a communication channel.

7. The system of claim 1, wherein the storage unit comprises a database containing pre-programmed object template information.

8. The device system of claim 7 wherein the storage unit is adapted to accept new information to modify the database.

9. The system of claim 1, wherein the autonomous device is a lead autonomous device and is adapted to coordinate the operation of at least one other device acting as a wing device tat assists the lead autonomous device in identifying an object.

10. The system of claim 1, wherein the autonomous device is coupled aver a communication channel to a central communication unit that centrally communicates with the autonomous device and other autonomous devices operating in the environment.

11. The system of claim 1, wherein the decision affecting the status of the autonomous device is a decision to transmit communication information to another autonomous device.

12. The system of claim 1, wherein the decision affecting the status of the autonomous device is a decision to move the autonomous device from one location to another.

13. The system of claim 1, wherein the decision affecting the status of the autonomous device is a decision to switch the autonomous device from one mode of operation to another.

14. A method for identifying objects in an environment, comprising:
    providing at least first and second mobile autonomous devices for operation in the environment the first and second autonomous devices respectively comprising first and second databases and first and second sensors;
    providing object template data, corresponding to the objects, in the first and second databases;
    sensing signals from a first object using the first sensor;
    using the first autonomous device, evaluating a degree of match between an object template and the sensed signals, wherein the first autonomous device automatically moves to increase the degree of match between the sensed signals and the object template and identifies the object by determining that the degree of match has exceeded a predetermined threshold;
    directly transmitting information relating to the object from the first autonomous device to the second autonomous device; and
    reconfiguring the second autonomous device in space, without human intervention, based at least in part on said transmitted information.

15. The method of claim 14, wherein the action comprises switching the autonomous device from one mode of operation to another.

16. The method of claim 14, further comprising communicating information between the at least one autonomous device to a second autonomous device, the information being for collaborative identification of the object.

17. The method of claim 16, wherein the at least one autonomous device and the second device operate in a communication network.

18. A system for identifying at least one object in an environment, comprising:
    a first autonomous device which detects at least a first signal from the object;

a second autonomous device which detects at least a second signal from the abject; and a communication network which connects the first and second autonomous devices and directly passes information between said first and second autonomous devices;

wherein each of said first and second autonomous devices each comprises a control module, a sensor module, and a communications module;

wherein the first autonomous device is adapted to evaluate a first match between the first signal and a first reference object template and transmit a result of said evaluation directly to the second autonomous device over the communication network;

wherein the second autonomous device is adapted to reconfigure itself in space, without human intervention, based at least in part on the result of said evaluation; and wherein said first and second matches arc indicative of an identity of the at least one object in the environment.

19. The system of claim 18, further comprising an external controller that coordinates communication between the first and second autonomous devices.

20. The system of claim 18, wherein the first and second autonomous devices are elements in a first network of devices, and wherein the system further comprises a second network of devices, similar to the first network of devices and in communication with the first network.

21. A system comprising:
a network comprising first and second autonomous devices for collaboratively identifying objects in an environment, each autonomous device comprising:
  a sensor unit adapted to sense information relating to an object;
  a storage unit containing object template information corresponding to the object;
  a computation unit adapted to process the sensed signals, wherein the computation unit comprises an algorithm to compute a degree of match between the sensed signals and the object template information;
  a communication unit adapted to communicate information relating to operation of the autonomous device with other devices; and
  a control unit adapted to make a decision affecting a status of the autonomous device based at least on a result of the computation of the degree of match;
wherein the first and second autonomous devices respectively comprise first and second sensors adapted to sense a condition relating to the performance of the network and wherein the first and second autonomous devices are respectively adapted to carry first and second information pertaining to the condition; and
wherein the first autonomous device is adapted to receive the second information pertaining to the condition and update the first information pertaining to the condition based on the second information; and
wherein the first autonomous devices is adapted to reconfigure itself in space, without human intervention, based at least in part on the second information.

22. The system of claim 21, wherein the system further comprises first and second nodes, and wherein said first autonomous device is adapted to move information from the first node to the second node by moving from the first node to the second node while carrying the first information within the autonomous device.

23. The system of claim 21, wherein the system further comprises first and second nodes, and wherein said first autonomous device is adapted to move information from the first node to the second node by transmitting an information packet containing the first information to said second node.

24. The system of claim 21, wherein said condition corresponds to a communication signal travel time.

25. The system of claim 21, wherein each autonomous device carries a representation of the condition across the network in its entirety.

26. A method for determining an optimum configuration of agents operating in an environment, the method comprising:
sensing, using a first agent in the environment, a first environmental signal;
forming a first representation of the first environmental signal;
sensing, using a second agent in the environment, a second environmental signal;
forming a second representation of the second environmental signal;
directly exchanging, between the first and second agents, the respective first and second representations;
within the first or second agent, computing a performance metric corresponding to a first configuration of the first and second agents, the performance metric corresponding to an overlap between an environmental signal and a stored target template; and
reconfiguring the first and second agents, based on the performance metric and without human intervention, to arrive at a new configuration of the first and second agents.

27. The method of claim 26, further comprising making a decision to include a third agent in the new configuration.

28. The method of claim 26, wherein the first and second agents are autonomous devices.

29. The method of claim 28, wherein the autonomous devices are mobile autonomous vehicles.

30. The method of claim 29, wherein the mobile autonomous vehicles are any of: airborne vehicles, land vehicles and waterborne vehicles.

31. The method of claim 26, wherein the acts of the method are carried out as a simulation running on a machine executing programmed instructions.

32. The method of claim 26, wherein determination of the optimum configuration provides information regarding scalability of the system as the number and type of agents is varied.

* * * * *

UNITED STATES PATENT AND TRADEMARK OFFICE
CERTIFICATE OF CORRECTION

| | |
|---|---|
| PATENT NO. | : 7,266,532 B2 |
| APPLICATION NO. | : 10/161058 |
| DATED | : September 4, 2007 |
| INVENTOR(S) | : Jeffrey P. Sutton et al. |

It is certified that error appears in the above-identified patent and that said Letters Patent is hereby corrected as shown below:

In Column 8, line 14, "too" should read --100--.

In Column 12, line 1, "values is relayed" should read --values relayed--.

In Column 14, line 25, "e," should read --$\varepsilon$,--.

In Column 14, line 28, "considerations with," should read --considerations with--.

In Column 15, line 5, "Mode of operation" should read --mode of operation--.

In Column 15, line 7, "Mode 0r" should read --mode or--.

In Column 16, line 49, "Mode of operation" should read --mode of operation--.

In Column 18, line 5, "$\sqrt{\sum_{j=1}^{N} (M_{ij}(t) \geq \varepsilon^2} / n \geq \theta$ ." should read --$\sqrt{\sum_{j=1}^{N} (M_{ij}(t) \geq \varepsilon)^2} / n \geq \theta$ .--.

In Column 20, line 13, "ranked in 1o descending value" should read --ranked in descending value--.

In Column 20, line 9, "aggressive Mode of" should read --aggressive mode of--.

In Column 20, line 24, "target is template j" should read --target template j--.

In Column 24, line 60, "grid Mode" should read --grid mode--.

In Column 26, line 2, Claim 5, "new data tat was" should read --new data that was--.

In Column 26, line 10, Claim 8, "The device system" should read --The system--.

In column 26, line 15, Claim 9, "tat assists" should read --that assists--.

In Column 26, line 18, Claim 10, "coupled aver" should read --coupled over--.

UNITED STATES PATENT AND TRADEMARK OFFICE
CERTIFICATE OF CORRECTION

PATENT NO. : 7,266,532 B2
APPLICATION NO. : 10/161058
DATED : September 4, 2007
INVENTOR(S) : Jeffrey P. Sutton et al.

It is certified that error appears in the above-identified patent and that said Letters Patent is hereby corrected as shown below:

In Column 26, line 35, Claim 14, "environment the first" should read --environment, the first--.

In Column 27, line 2, Claim 16, "abject" should read --object--.

In Column 27, line 19, Claim 18, "arc indicative" should read --are indicative--.

Signed and Sealed this

Fourth Day of December, 2007

JON W. DUDAS
*Director of the United States Patent and Trademark Office*